United States Patent
Wu et al.

(10) Patent No.: US 11,816,636 B2
(45) Date of Patent: Nov. 14, 2023

(54) MINING TRAINING DATA FOR TRAINING DEPENDENCY MODEL

(71) Applicant: Microsoft Technology Licensing, LLC, Redmond, WA (US)

(72) Inventors: Liwei Wu, Davis, CA (US); Wenjia Ma, San Jose, CA (US); Jaewon Yang, Sunnyvale, CA (US); Yanen Li, Foster City, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 17/412,753

(22) Filed: Aug. 26, 2021

(65) Prior Publication Data
US 2023/0086724 A1 Mar. 23, 2023

(51) Int. Cl.
G06Q 10/1053 (2023.01)
G06N 20/20 (2019.01)
G06Q 10/0631 (2023.01)
G06N 5/01 (2023.01)

(52) U.S. Cl.
CPC ......... *G06Q 10/1053* (2013.01); *G06N 5/01* (2023.01); *G06N 20/20* (2019.01); *G06Q 10/063112* (2013.01)

(58) Field of Classification Search
None
See application file for complete search history.

(56) References Cited

U.S. PATENT DOCUMENTS

| | | | |
|---|---|---|---|
| 10,535,018 B1* | 1/2020 | Kenthapadi | G06Q 50/01 |
| 11,210,636 B1* | 12/2021 | Hughes | G06F 40/30 |
| 11,321,671 B2* | 5/2022 | Bykov | G06Q 10/1053 |
| 2014/0278633 A1* | 9/2014 | Daly | G06Q 10/1053 705/7.14 |

(Continued)

OTHER PUBLICATIONS

Aggarwal, et al., "A survey of text classification algorithms", In Publication of Springer, 2012, pp. 163-222.

(Continued)

*Primary Examiner* — Florian M Zeender
*Assistant Examiner* — Karma A El-Chanti
(74) *Attorney, Agent, or Firm* — Schwegman, Lundberg & Woessner, P.A.

(57) ABSTRACT

Techniques for mining training data for use in training a dependency model are disclosed herein. In some embodiments, a computer-implemented method comprises: obtaining training data comprising a plurality of reference skill pairs, each reference skill pair comprising a corresponding first reference skill and a corresponding second reference skill, the plurality of reference skill pairs being included in the training data based on a co-occurrence of the corresponding first and second reference skills for each reference skill pair in the plurality of reference skill pairs, the co-occurrence comprising the corresponding first and second reference skills co-occurring for a same entity; and training a dependency model with a machine learning algorithm using the training data, the dependency model comprising a logistic regression model or a data gradient boosted decision tree (GBDT) model. The dependency model may then be used to identify corresponding dependency relations for a plurality of target skill pairs.

20 Claims, 12 Drawing Sheets

(56) References Cited

U.S. PATENT DOCUMENTS

| | | | |
|---|---|---|---|
| 2017/0032324 A1* | 2/2017 | Grover | G06Q 10/1053 |
| 2017/0213179 A1* | 7/2017 | Schissel | H04L 67/306 |
| 2017/0221164 A1* | 8/2017 | Loof | G06Q 50/2057 |
| 2018/0261118 A1* | 9/2018 | Morris | G09B 7/02 |
| 2018/0349501 A1* | 12/2018 | Ramanath | G06F 16/285 |
| 2019/0163798 A1* | 5/2019 | Chimka | G06Q 50/00 |
| 2019/0188742 A1* | 6/2019 | Vasudevan | G06Q 30/0202 |
| 2019/0197487 A1* | 6/2019 | Jersin | G06F 16/635 |
| 2019/0220547 A1* | 7/2019 | Chen | G06Q 50/2057 |
| 2019/0340945 A1* | 11/2019 | Malhotra | G06N 3/084 |
| 2020/0242714 A1* | 7/2020 | Doti | H04L 67/306 |
| 2021/0056651 A1* | 2/2021 | Sengupta | G06Q 50/2057 |
| 2021/0142789 A1* | 5/2021 | Gurbani | G10L 15/16 |
| 2021/0303783 A1* | 9/2021 | Misra | G06N 20/00 |
| 2021/0365780 A1* | 11/2021 | Liang | G06N 3/08 |
| 2021/0406735 A1* | 12/2021 | Nahamoo | G06N 3/08 |
| 2022/0020464 A1* | 1/2022 | Zivkovic | G16H 10/60 |
| 2022/0027573 A1* | 1/2022 | Gadi | G06F 16/906 |
| 2022/0051080 A1* | 2/2022 | Hajarnis | G06K 9/623 |
| 2022/0094649 A1* | 3/2022 | Le | G06N 3/0481 |
| 2022/0100958 A1* | 3/2022 | Kiazand | G06N 3/08 |
| 2022/0284374 A1* | 9/2022 | Cahalane | G06Q 10/06398 |
| 2022/0309516 A1* | 9/2022 | Rhoads | G06N 20/00 |
| 2022/0327488 A1* | 10/2022 | Ramani | G06N 3/0454 |

OTHER PUBLICATIONS

Bradley, Andrew P., "The Use of the Area Under the ROC Curve in the Evaluation of Machine Learning Algorithms", In the Journal of Pattern Recognition, vol. 30, Issue 7, Jul. 1997, 33 Pages.

Devlin, et al., "BERT: Pre-training of Deep Bidirectional Transformers for Language Understanding", In Repository of arXiv: 1810.04805, Oct. 11, 2018, 14 Pages.

Kleinbaum, et al., "Logistic Regression—A Self-Learning Text", In Publication of Springer, 2002.

Melamud, et al., "context2vec: Learning generic context embedding with bidirectional lstm", In Proceedings of the 20th SIGNLL conference on computational natural language learning, Aug. 7, 2016, pp. 51-61.

Pedregosa, et al., "Scikit-learn: Machine Learning in Python", In Journal of Machine Learning Research, vol. 12, Oct. 2011, pp. 2825-2830.

Wu, et al., "Sql-rank: A listwise approach to collaborative ranking", In Proceedings of 35th International Conference on Machine Learning, Jul. 3, 2018, 10 Pages.

Devlin, et al., "BERT: Pre-training of Deep Bidirectional Transformers for Language Understanding", In Repository of arXiv:1810.04805v2, May 24, 2019, 16 Pages.

Huang, et al., "CoRel: Seed-Guided Topical Taxonomy Construction by Concept Learning and Relation Transferring", In Proceedings of the 26th ACM SIGKDD International Conference on Knowledge Discovery & Data Mining, Aug. 23, 2020, 9 Pages.

Yao, et al., "KG-Bert: BERT for Knowledge Graph Completion", In Repository of arXiv: 1909.03193v2, Sep. 11, 2019, 8 Pages.

Aggarwal, et al., "A survey of text classification algorithms", In Publication of Springer, Jan. 1, 2012, pp. 163-222.

Bastian, et al., "Linkedin Skills: Large-Scale Topic Extraction and Inference", In Proceedings of the 8th ACM Conference on Recommender systems., Oct. 2014, pp. 1-8.

Bojanowski, et al., "Enriching Word Vectors with Subword Information", In Journal of Transactions of the Association for Computational Linguistics, vol. 5, Jun. 2017, pp. 135-146.

Bradley, Andrew P., "The Use of the Area Under the ROC Curve in the Evaluation of Machine Learning Algorithms", In Journal of Pattern Recognition, vol. 30, Issue 7, Jul. 1997, 33 Pages.

Clark, et al., "ELECTRA: Pre-Training Text Encoders as Discriminators Rather than Generators", In Repository of arXiv:2003.10555v1, Mar. 23, 2020, pp. 1-18.

Covington, et al., "Deep Neural Networks for YouTube Recommendations", In Proceedings of the 10th ACM Conference on Recommender Systems, Sep. 15, 2016, 8 Pages.

Cruys, Tim Van De, "Two Multivariate Generalizations of Pointwise Mutual Information", In Proceedings of the Workshop on Distributional Semantics and Compositionality, Jun. 2011, 5 Pages.

Domeniconi, et al., "Job Recommendation from Semantic Similarity of Linkedin Users' Skills", In International Conference on Pattern Recognition Applications and Methods, vol. 2, Feb. 24, 2016, pp. 270-277.

Gugnani, et al., "Generating United Candidate Skill Graph for Career Path Recommendation", In Proceedings of IEEE International Conference on Data Mining Workshops, Nov. 17, 2018, pp. 328-333.

Gugnani, "Implicit Skills Extraction Using Document Embedding and its Use in Job Recommendation", In the Thirty-Second Innovative Applications of Artificial Intelligence Conference, Feb. 2020, pp. 13286-13293.

Guo, et al., "Detext: A Deep Text Ranking Framework with Bert", In Proceedings of the 29th ACM International Conference on Information & Knowledge Management, Oct. 19, 2020, pp. 2509-2516.

Ha-Thuc, et al., "Personalized Expertise Search at LinkedIn", In Proceedings of IEEE International Conference on Big Data, Oct. 29, 2015, pp. 1238-1247.

Jerome, Friedmanh., "Greedy Function Approximation: A Gradient Boosting Machine", In Journal of Annals of Statistics, vol. 29, Issue 5, Oct. 2001, pp. 1189-1232.

Kim, Yoon, "Convolutional Neural Networks for Sentence Classification", In Repository of arXiv:1408.5882v1, Aug. 25, 2014, 6 Pages.

Kleinbaum, et al., "Logistic Regression—A Self-Learning Text", In Publication of Springer, Jan. 1, 2002, 517 Pages.

Kowsari, et al., "Text Classification Algorithms: A Survey", In Journal of Information, vol. 10, Issue 4, Apr. 23, 2019, pp. 1-68.

Lan, et al., "Albert: A Lite Bert For Self-Supervised Learning of Language Representations", In Repository of arXiv: 1909.11942v1, Sep. 26, 2019, 16 Pages.

Liu, et al., "RoBERTa: A Robustly Optimized BERT Pretraining Approach", In Repository of arXiv:1907.11692v1, Jul. 26, 2019, 13 Pages.

Melamud, et al., "Context2vec: Learning Generic Context Embedding With Bidirectional Lstm", In Proceedings of the 20th SIGNLL conference on computational natural language learning, Aug. 7, 2016., pp. 51-61.

Meng, et al., "Text Classification Using Label Names Only: A Language Model Self-Training Approach", In Repository of arXiv:2010.07245v1, Oct. 14, 2020, 12 Pages.

Mikolov, et al., "Distributed Representations of Words and Phrases and their Compositionality", In Journal of Computing Research Repository, Oct. 2013, pp. 1-9.

Pedregosa, et al., "Scikit-learn: Machine Learning in Python", In Journal of Machine Learning Research, vol. 12, Nov. 1, 2011, pp. 2825-2830.

Pennington, et al., "Glove: Global Vectors for Word Representation", In Proceedings of the Conference on Empirical Methods in Natural Language Processing, Oct. 25, 2014, pp. 1532-1543.

Peters, et al., "Deep Contextualized Word Representations", In Repository of arXiv:1802.05365, Feb. 15, 2018, 15 Pages.

Radford, et al., "Improving Language Understanding by Generative Pre-Training", In Technical Report, OpenAI Jun. 11, 2018, 12 Pages.

Radford, et al., "Language Models are Unsupervised Multitask Learners", In Journal of OpenAI Blog, vol. 1, Issue 8, Feb. 24, 2019, 24 Pages.

Shi, et al., "Salience and Market-Aware Skill Extraction for Job Targeting", In Proceedings of the 26th ACM SIGKDD International Conference on Knowledge Discovery & Data Mining,, Aug. 23, 2020, pp. 2871-2879.

Vaswani, et al., "Attention is all you need", In Proceedings of Computing Research Repository, Jun. 30, 2017, pp. 1-15.

Wu, et al., "Large-Scale Collaborative Ranking In Near-Linear Time", In Proceedings of the 23rd ACM SIGKDD International Conference on Knowledge Discovery and Data Mining, Aug. 13, 2017, pp. 515-524.

(56) References Cited

OTHER PUBLICATIONS

Wu, et al., "Sql-Rank: A Listwise Approach to Collaborative Ranking", In Proceedings of International Conference on Machine Learning, Jul. 3, 2018, 10 Pages.

Wu, et al., "Sse-Pt: Sequential Recommendation Via Personalized Transformer", In Proceedings of Fourteenth ACM Conference on Recommender Systems, Sep. 22, 2020, pp. 328-337.

Xue, et al., "Ranking User Attributes for Fast Candidate Selection in Recommendation Systems", In Proceedings of the 29th ACM International Conference on Information & Knowledge Management, Oct. 19, 2020, pp. 2869-2876.

Xie, et al., "Unsupervised Data Augmentation for Consistency Training", In Repository of arxiv:1904.12848v2, Jul. 10, 2019, 20 Pages.

Yan, et al., "Social Skill Validation at Linkedin", In Proceedings of the 25th ACM SIGKDD International Conference on Knowledge Discovery & Data Mining, Aug. 4, 2019, pp. 2943-2951.

Yang, et al., "Xlnet: Generalized Autoregressive Pretraining for Language Understanding", In Repository of arXiv:1906.08237, Jun. 19, 2019, 18 Pages.

Yang, et al., "Multilingual Universal Sentence Encoder for Semantic Retrieval", In Repository of arXiv: 1907.04307v1, Jul. 9, 2019, 6 Pages.

Zhang, et al., "Character-Level Convolutional Networks for Text Classification", In Repository of arXiv: 1509.01626v1. Sep. 4, 2015, pp. 1-9.

Zhang, et al., "Clustering Based Two-Stage Text Classification Requiring Minimal Training Data", In Proceedings of International Conference on Systems and Informatics, May 2012, pp. 2233-2237.

\* cited by examiner

BECOME A DATA SCIENTIST  5 ITEMS  5 HOURS 50 MINUTES

① ▷ PLAY COURSE  ← 310

USING BRACKETOLOGY TO LEARN DATA SCIENCE

RELEASED: JULY 17, 2017
20 MINUTES

② ▷ PLAY COURSE

DATA SCIENCE & ANALYTICS: FIRST STEPS

RELEASED: DECEMBER 25, 2017
1 HOUR 10 MINUTES

③ ▷ PLAY COURSE

DATA SCIENCE: FUNDAMENTALS

RELEASED: JULY 7, 2018
3 HOURS 50 MINUTES

④ ▷ PLAY COURSE

STATISTICS

RELEASED: AUGUST 17, 2015
20 MINUTES

⑤ ▷ PLAY COURSE

MANAGING AND ANALYZING DATA

RELEASED: JULY 30, 2016
10 MINUTES

▭ EARN YOUR CERTIFICATE OF COMPLETION

SENIOR SOFTWARE DESIGNER
510 → LINKEDIN
SAN FRANCISCO BAY AREA
POSTED 2 DAYS AGO – 682 VIEWS

512
[ SAVE ]  [ APPLY ] — 520

JOB DESCRIPTION
WE ARE LOOKING FOR A HARD WORKING PASSIONATE SENIOR SOFTWARE ENGINEER WITH A FOCUS ON BOTH INTERFACE AND VISUAL DESIGN. THE IDEAL CANDIDATE IS A TEAM LEADER AND HAS EXPERIENCE IN DIGITAL ENTERPISE PRODUCTS OR SOFTWARE-AS-A-SERVICE, CREATING VISUALIZATIONS, CHARTS, AND DASHBOARDS.

SENIORITY LEVEL
SENIOR

INDUSTRY
COMPUTER SOFTWARE, INFORMATION TECHNOLOGY AND SERVICES, INTERNET

EMPLOYMENT TYPE
FULL-TIME

REQUIREMENTS
- 5+ YEARS PROFESSIONAL EXPERIENCE IN WEB DESIGN
- EXPERIENCE WORKING WITH LARGE, HIGH-TRAFFIC E-COMMERCE WEBSITES
- EXPERIENCE WITH HTML/CSS AND JAVASCRIPT

SEE MORE ▽

MINING TRAINING DATA FOR TRAINING DEPENDENCY MODEL

TECHNICAL FIELD

The present application relates generally to training artificial intelligence models for use in determining dependency relations.

BACKGROUND

Online service providers, such as social networking services, e-commerce and marketplace services, photo sharing services, job hosting services, educational and learning services, and many others, typically require that each end-user register with the individual service to establish a user account. In most instances, a user account will include or be associated with a user profile—a digital representation of a person's identity. As such, a user profile may include a wide variety of information about the user, which may vary significantly depending upon the particular type and nature of the online service. By way of example, in the context of a social networking service, a user's profile may include information such as: first and last name, e-mail address, age, location of residence, a summary of the user's educational background, job history, and/or experiences, as well as individual skills possessed by the user. A user profile may include a combination of structured and unstructured data. For example, whereas a user's age may be stored in a specific data field as structured data, other profile information may be inferred from a free form text field such as a summary of a user's experiences. Furthermore, while some portions of a user profile, such as an e-mail address, may be mandatory—that is, the online service may require the user to provide such information in order to register and establish an account—other portions of a user profile may be optional.

In many instances, the quality of the experience a user has with a particular online service may vary significantly based on the extent to which the user has provided information to complete his or her user profile. Generally, the more complete a user profile is, the more satisfied the user is likely to be with various features and functions of the online service. By way of example, consider the extent to which a user has listed in his or her profile for a professional social networking service the skills possessed by the user. In the context of an online service, a variety of content-related and recommendation services utilize various aspects of a user's profile information—particularly skills—for targeting users to receive various content and for generating recommendations. For example, a content selection and ranking algorithm associated with a news feed, which may be referred to as a content feed, or simply a feed, may select and/or rank content items for presentation in the user's personalized content feed based on the extent to which the subject matter of a content item matches the perceived interests of the user. Here, the user's perceived interests may be based at least in part on the skills that he or she has listed in his or her profile. Similarly, a job-related search engine and/or recommendation service may select and/or rank job postings for presentation to a user based in part on skills listed in a profile of the user. Finally, a recommendation service for online courses may generate course recommendations for a user based at least in part on the skills that the user lists in his or her profile. Accordingly, the value of these services to the user can be significantly greater when the user has completed his or her profile by adding his or her skills. Specifically, with a completed profile and accurate list of skills, the user is more likely to receive relevant information that is of interest to the user.

However, when certain profile information is made optional, there are a variety of reasons that a user may be hesitant to add such information to his or her end-user profile. First, a user may not appreciate the increased value that he or she will realize from the various online services when his or her profile is complete. Second, a user may not understand how to add certain information to his or her profile, or a user may simply not want to take the time to add the information to his or her user profile. Finally, it may be difficult for a user to understand specifically what information—for example, which skills—the end—user should add to his or her user profile. Accordingly, many online services prompt users to add information to their user profile. For example, in the context of a social networking service—particularly a professional social networking service—a profile completion service may prompt users to add skills to their respective user profiles.

Current solutions for using skills data to provide services fail to accurately and efficiently address dependency relations between skills. These current solutions are mainly focused on skill extraction, skill salience, and skill-based personalized recommendation tasks, while ignoring dependency relations between different skills. This neglect is due to a lack of training data and difficulties in creating training data. Skills can be very technical and sometimes only make sense to domain experts, so raw texts alone are not very informative, and useful features for use in training data are hard to obtain. Skills span thousands of industries and are very heterogeneous. A pair of skills, such as a first skill and a second skill, is also referred to herein as a "skill pair." Over 99.99% of skill pairs are negative examples of a dependency relation, so creating a more balanced labelled dataset is challenging and requires sophisticated large-scale data mining techniques. Current solutions are also unable to scale adequately. For example, a cartography is a map that represents the transition paths between entities according to dependency relations. Building a cartography for skills to be used by an online service is extremely computationally expensive, given that there are more than 40,000 skills, resulting in over one billion skill pairs to process. These technical problems prevent online services from accurately and efficiently accounting for dependency relations between skills.

BRIEF DESCRIPTION OF THE DRAWINGS

Some embodiments of the present disclosure are illustrated by way of example and not limitation in the figures of the accompanying drawings, in which like reference numbers indicate similar elements.

FIG. 3 illustrates a graphical user interface (GUI) in which a sequential playlist of online courses available to users for viewing via an online service is displayed, in accordance with an example embodiment.

FIG. 5 illustrates a GUI in which an online job posting is displayed, in accordance with an example embodiment.

FIG. 8 illustrates a GUI in which user interface elements that identify profiles of users are displayed, in accordance with an example embodiment.

DETAILED DESCRIPTION

I. Overview

Figure 1:
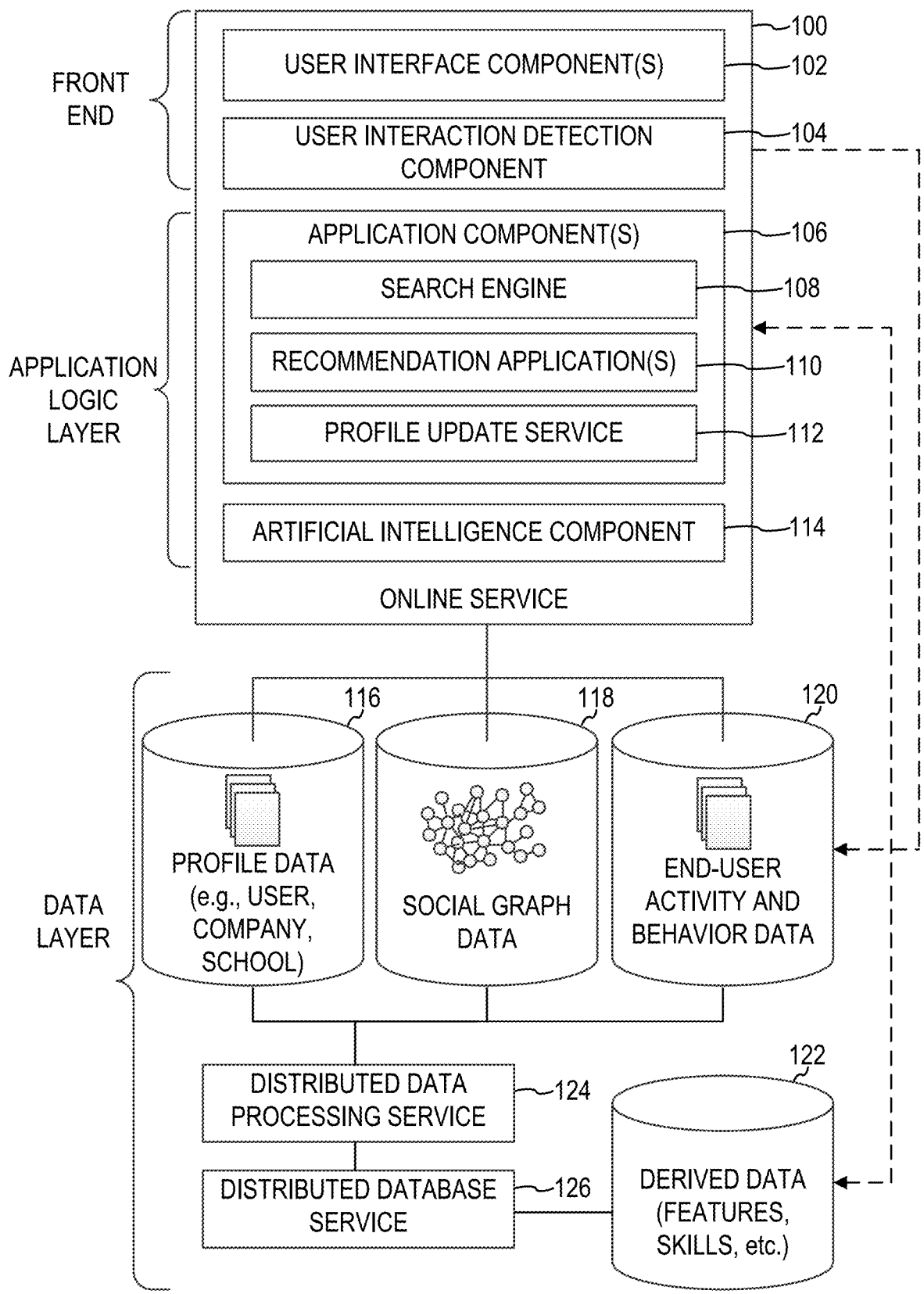
FIG. 1 is a block diagram illustrating functional components of an online service, in accordance with an example embodiment.

Example methods and systems of training artificial intelligence models for use in determining dependency relations are disclosed. In the following description, for purposes of explanation, numerous specific details are set forth in order to provide a thorough understanding of example embodiments. It will be evident, however, to one skilled in the art that the present embodiments may be practiced without these specific details.

The above-discussed technical problems of accuracy and efficiency are addressed by one or more example embodiments disclosed herein, in which a specially-configured computer system is configured to use a two-stage approach to tackle the large-scale skill dependency task by using a light feature-based model to identify dependency relations between skill pairs in a first stage and using a more sophisticated model to determine relation directions in a second stage. The two-stage approach of the present disclosure outperforms other alternative state-of-the-art methods in terms of both accuracy and speed, enabling the computer system of an online service to accurately and efficiently process over one billion skill pairs.

In some example embodiments, the computer system generates training data comprising a plurality of reference skill pairs, with each reference skill pair comprising a corresponding first reference skill and a corresponding second reference skill. The plurality of reference skill pairs are included in the training data based on a co-occurrence of the corresponding first and second reference skills for each reference skill pair in the plurality of reference skill pairs. The co-occurrence comprises the corresponding first and second reference skills co-occurring for a same entity, such as being included in the same sequential playlist of online courses, being included in the same history of online courses watched by a user, being added to the same user profile, or being included in the same online job posting. In some example embodiments, the computer system trains a dependency model with a first machine learning algorithm using the training data, where the dependency model comprises a logistic regression model or a data gradient boosted decision tree (GBDT) model, and also trains a Bidirectional Encoder Representations from Transformers (BERT) model with a second machine learning algorithm using the training data.

Next, the computer system identifies a corresponding dependency relation for each target skill pair in a plurality of target skill pairs using the dependency model, with each target skill pair in the plurality of target skill pairs comprising a corresponding first target skill and a corresponding second target skill, and the corresponding dependency relation being between the corresponding first and second target skills of the corresponding target skill pair. For each target skill pair in the plurality of target skill pairs, the computer system determines a corresponding relation direction using the BERT model. Then, the computer system uses the corresponding identified dependency relation and determined relation direction for at least a portion of the plurality of target skill pairs in an application of an online service. The term "reference" is used herein to indicate data and entities being used or involved in the training of models. The term "target" is used herein to indicate data and entities being used or involved in the use of the trained models.

II. Detailed Example Embodiments

The methods or embodiments disclosed herein may be implemented as a computer system having one or more components implemented in hardware or software. For example, the methods or embodiments disclosed herein may be embodied as instructions stored on a machine-readable medium that, when executed by one or more hardware processors, cause the one or more hardware processors to perform the instructions.

FIG. 1 is a block diagram illustrating functional components of an online service 100, in accordance with an example embodiment. As shown in FIG. 1, a front end may comprise one or more user interface components (e.g., a web server) 102, which receives requests from various client computing devices and communicates appropriate responses to the requesting client devices. For example, the user interface component(s) 102 may receive requests in the form of Hypertext Transfer Protocol (HTTP) requests or other web-based API requests. In addition, a user interaction detection component 104, sometimes referred to as a click tracking service, may be provided to detect various interactions that end-users have with different applications and services, such as those included in the application logic layer of the online service 100. As shown in FIG. 1, upon detecting a particular interaction, the user interaction detection component 104 logs the interaction, including the type of interaction and any metadata relating to the interaction, in an end-user activity and behavior database 120. Accordingly, data from this database 120 can be further processed to generate data appropriate for training one or more machine-learned models, and in particular, for training models to rank a set of skills for an end-user.

An application logic layer may include one or more application server components 106, which, in conjunction with the user interface component(s) 102, generate various user interfaces (e.g., web pages) with data retrieved from various data sources in a data layer. Consistent with some embodiments, individual application server components 106 implement the functionality associated with various applications and/or services provided by the online service 100. For instance, as illustrated in FIG. 1, the application logic layer includes a variety of applications and services to include a search engine 108, one or more recommendation applications 110 (e.g., a job recommendation application, an online course recommendation application), and a profile update service 112. The various applications and services illustrated as part of the application logic layer are provided as examples and are not meant to be an exhaustive listing of all applications and services that may be integrated with and provided as part of the online service 100. For example, although not shown in FIG. 1, the online service 100 may also include a job hosting service via which end-users submit job postings that can be searched by end-users, and/or recommended to other end-users by the recommendation application(s) 110. As end-user's interact with the various user interfaces and content items presented by these applications and services, the user interaction detection component 104 detects and tracks the end-user interactions, logging relevant information for subsequent use.

As shown in FIG. 1, the data layer may include several databases, such as a profile database 116 for storing profile data, including both end-user profile data and profile data for various organizations (e.g., companies, schools, etc.). Consistent with some embodiments, when a person initially registers to become an end-user of the online service, the person will be prompted by the profile update service 112 to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 116. Similarly, when a representative of an organization initially registers the organization with the online service 100, the representative may be prompted to provide certain information about the organization. This information may be stored, for example, in the profile database 116, or another database (not shown).

Once registered, an end-user may invite other end-users, or be invited by other end-users, to connect via the online service 100. A "connection" may constitute a bilateral agreement by the end-users, such that both end-users acknowledge the establishment of the connection. Similarly, with some embodiments, an end-user may elect to "follow" another end-user. In contrast to establishing a connection, the concept of "following" another end-user typically is a unilateral operation and, at least with some embodiments, does not require acknowledgement or approval by the end-user that is being followed. When one end-user follows another, the end-user may receive status updates relating to the other end-user, or other content items published or shared by the other end-user user who is being followed. Similarly, when an end-user follows an organization, the end-user becomes eligible to receive status updates relating to the organization as well as content items published by, or on behalf of, the organization. For instance, content items published on behalf of an organization that an end-user is following will appear in the end-user's personalized feed, sometimes referred to as a content feed or news feed. In any case, the various associations and relationships that the end-users establish with other end-users, or with other entities (e.g., companies, schools, organization) and objects (e.g., metadata hashtags ("#topic") used to tag content items), are stored and maintained within a social graph in a social graph database 118.

As end-users interact with the various content items that are presented via the applications and services of the online service 100, the end-users' interactions and behaviors (e.g., content viewed, links or buttons selected, messages responded to, job postings viewed, etc.) are tracked by the user interaction detection component 104, and information concerning the end-users' activities and behaviors may be logged or stored, for example, as indicated in FIG. 1 by the end-user activity and behavior database 120.

Consistent with some embodiments, data stored in the various databases of the data layer may be accessed by one or more software agents or applications executing as part of a distributed data processing service 124, which may process the data to generate derived data. The distributed data processing service 124 may be implemented using Apache Hadoop® or some other software framework for the processing of extremely large data sets. Accordingly, an end-user's profile data and any other data from the data layer may be processed (e.g., in the background or offline) by the distributed data processing service 124 to generate various derived profile data. As an example, if an end-user has provided information about various job titles that the end-user has held with the same organization or different organizations, and for how long, this profile information can be used to infer or derive an end-user profile attribute indicating the end-user's overall seniority level or seniority level within a particular organization. This derived data may be stored as part of the end-user's profile or may be written to another database.

In addition to generating derived attributes for end-users' profiles, one or more software agents or applications executing as part of the distributed data processing service 124 may ingest and process data from the data layer for the purpose of generating training data for use in training various machine-learned models, and for use in generating features for use as input to the trained models. For instance, profile data, social graph data, and end-user activity and behavior data, as stored in the databases of the data layer, may be ingested by the distributed data processing service 124 and processed to generate data properly formatted for use as training data for training one of the aforementioned machine-learned models for ranking skills. Similarly, the data may be processed for the purpose of generating features for use as input to the machine-learned models when ranking skills for a particular end-user. Once the derived data and features are generated, they are stored in a database 122, where such data can easily be accessed via calls to a distributed database service 124.

In some example embodiments, the application logic layer of the online service 100 also comprises an artificial intelligence component 114 that is configured to train and use a first artificial intelligence model to determine whether there is a dependency relation between a pair of skills (also referred to herein as a "skill pair"). The artificial intelligence component 114 may also be configured to train and use a second artificial intelligence model to determine a relation direction for the skill pair for which a dependency relation was identified by the first artificial intelligence model.

Figure 2:
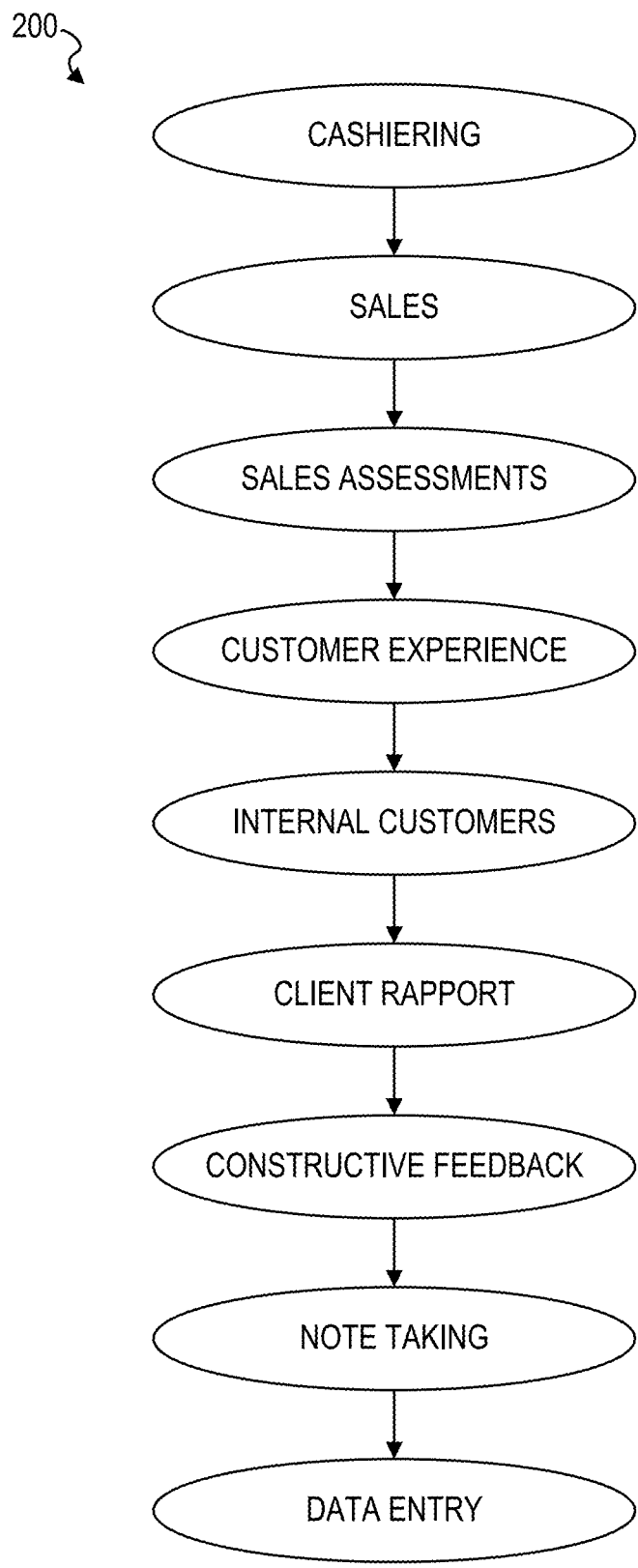
FIG. 2 illustrates a transition path of skills, in accordance with an example embodiment.

In some example embodiments, the artificial intelligence component 114 is configured to build a cartography of skills. The cartography of skills is a map of skills that comprises transition paths between skills according to dependency relations identified by the artificial intelligence component 114. Just like travelling on a real map, the transitivity rule does not necessarily hold: skill A can depend on B, and skill B can depend on C, but it does necessarily mean that skill A depends on skill C. The skill dependency relation implies one skill helps a person learn (or otherwise leads to) another skill at a later time, such that the temporal ordering matters. For example, people usually acquire the skill "machine learning" before the skill "neural networks," but usually not the other way around. FIG. 2 illustrates a transition path of skills 200, in accordance with an example embodiment. In FIG. 2, the transition path of skills 200 includes a transition from the skill "cashiering" to the skill "sales," a transition from the skill "sales" to the skill "sales assessments," a transition from the skill "sales assessments" to the skill "customer experience," a transition from the skill "customer experience" to the skill "internal customers," a transition from the skill "internal customers" to the skill "client rapport," a transition from the skill "client rapport" to the skill "constructive feedback," a transition from the skill "constructive feedback" to the skill "note taking," and a transition from the skill "note taking" to the skill "data entry."

Being able to infer skill dependence relationship for any skill pair enables the artificial intelligence component 114 to construct a high quality skill cartography, which may be used in applications of the online service 100. In some example embodiments, the artificial intelligence component 114 constructs the cartography of skills by generating a directed graph with edges representing dependency relations. For example, given a pool of S skills: $s_1, s_2, \ldots, s_S$, the artificial intelligence component 114 may be configured to output a directed graph G with edges between skill $s_i$ and skill $s_j$ if and only if $s_i \rightarrow s_j$, where $\rightarrow$ means the skill $s_i$ depends upon the skill $s_j$.

One technical problem faced when approaching the task of skill cartography is the lack of readily accessible high-quality labelled training data. There are billions of potential skill pairs for over 40,000 skills and it is extremely difficult to know the appropriate label. Skill pairs can be labelled as a positive example or as a negative example. A positive example of a skill pair is a skill pair in which there is a dependency relation between the two skills of the skill pair, whereas a negative example of a skill pair is a skill pair in which there is not a dependency relation between the two skills of the skill pair. The vast majority (more than 99.99%) of those skill pairs would be negative examples. Using naive ways to select positive skill pairs, such as random sampling, simply do not work. Therefore, the artificial intelligence component 114 implements a novel data mining pipeline to select the most promising positive skill pairs from different distinct sources.

In some example embodiments, the artificial intelligence component 114 is configured to generate training data comprising a plurality of reference skill pairs, with each reference skill pair comprising a corresponding first reference skill and a corresponding second reference skill. The plurality of reference skill pairs may be included in the training data based on a co-occurrence of the corresponding first and second reference skills for each reference skill pair in the plurality of reference skill pairs. In one example, the co-occurrence comprises the corresponding first and second reference skills co-occurring for a same entity, such that the plurality of reference skill pairs are included in the training data based on a determination that the corresponding first reference skill occurred for an entity and a determination that the corresponding second reference skill occurred for the same entity as the corresponding first reference skill.

In some example embodiments, the plurality of reference skill pairs being included in the training data is further based on a corresponding indication of a temporal order of the corresponding first and second reference skills for the same entity for each reference skill pair in the plurality of reference skill pairs. For example, the plurality of reference skill pairs may be included in the training data based on an indication of a chronological sequence including the occurrence of the corresponding first reference skill for an entity and the occurrence of the corresponding second reference skill for the same entity.

One example of a temporal order is found in learning paths. Learning Paths are sequential playlists of online courses that are designed to train users on a specific topic. The users can get a certificate after they finish viewing all of the online courses in the sequential playlist. In some example embodiments, the same entity for which the first reference skill and the second reference skill co-occur comprises a sequential playlist of online courses available to users for viewing via the online service 100. FIG. 3 illustrates a graphical user interface (GUI) 300 in which a sequential playlist of online courses available to users for viewing via the online service 100 is displayed, in accordance with an example embodiment. The GUI 300 may display corresponding selectable user interface elements 310 for each online course in the sequential playlist of online courses. In some example embodiments, each selectable user interface element 310 is configured to, in response to its selection by a user, trigger a playing of a multimedia file of the corresponding online course on a computing device of the user or initiate an online process for playing the multimedia file of the corresponding online course on the computing device of the user. Each online course in the sequential playlist of online courses has one or more corresponding reference skills associated with it. These associations may be stored in a database of the online service 100.

In some example embodiments, the artificial intelligence component 114 is configured to mine skill pairs from each sequential playlist of online courses. The logic behind mining reference skill pairs from sequential playlists is that reference skills covered by the later online courses should be more likely to depend upon the reference skills covered by the earlier online courses in the same sequential playlist. Therefore, by converting online course sequences into course pairs, the artificial intelligence component 114 can map them into reference skill pairs and then count the co-occurrences of each reference skill pair. Those skill pairs $(s_i; s_i')$ that are truly dependent upon one another should have a highly skewed binomial distribution: $(s_i, s_i')$ occurs much more often than $(s_i', s_i)$, so the artificial intelligence component 114 does not consider those reference skill pairs $(s_i; s_i')$ if $(s_i; s_i')$ occurs approximately as frequently as $(s_i',s_i)$.

In some example embodiments, the artificial intelligence component 114 uses the following Algorithm 1 to generate the reference skill pairs of the training data:

---

Require: course sequences $C_i = [C_{j1}, C_{j2}, \ldots, C_{jn}]$, where $1 \leq i \leq L$, course skill mappings $M = \{C_{jk}: [s_1, \ldots, s_m] \forall j,k\}$, where s represents a skill. Offset of skill pair counts is $X \geq 0$ and threshold of count ratio is $\theta$.

Ensure: skill pairs $S = \{(s_i, s_i')\}$ that likely satisfies $s_i \rightarrow s_i'$.
- Convert course sequences $C_i$ into course pairs $(C_{jk}, C_{jl})$ where $k < l$ and $\forall j$.
- Map course pairs $(C_{jk}, C_{jl})$ into skill pairs $(s_i, s_i')$ according to one-to-many course skill mappings M.
- for each of the skill pairs $(s_i, s_i')$ :
  - Count the co-occurrence of skill pairs $(s_i, s_i')$ and $(s_i', s_i)$ respectively as $c_1$ and $c_2$.

Calculate the count ratio using formula $r = \dfrac{c_1 + X}{c_2 + X}$.

* if $r > \theta$: add $(s_i, s_i')$ to S;

*else if $r < \dfrac{1}{\theta}$: add $(s_i', s_i)$ to S;

-continued

```
    * else continue;
 • Return S
```

The offset X is introduced to remove noise. The larger the offset is, the more noise it removes because those reference skill pairs that occur less frequently would have a count ratio r close to 1 and would then be filtered out by the threshold θ>1. Both X and 0 are hyper-parameters that can be tuned.

Another example of a temporal order is found in a history of online courses that have been watched by a user of the online service 100. The history of online courses that have been watched by the user is behavior data that is generated when the user watches an online course via the online service 100. Most users tend to start learning from something easy to something hard, so the temporal order in which user watched online courses may be used by the artificial intelligence component 114 as a signal that reflects skill dependency relationships. The artificial intelligence component may use Algorithm 1 to mine reference skill pairs from the history of online courses watched by users, except that the reference skill pairs may be aggregated over users instead of over learning paths, resulting in large counts of co-occurrence.

In some example embodiments, the same entity comprises a history of online courses that have been watched by a user of the online service 199. The history of online courses may be stored in association with the user, where the first reference skill is associated with a first online course in the history of online courses and the second reference skill is associated with a second online course in the history of online courses. The history of online courses that have been watched by the user may be stored in and accessed from the database 120.

Another example of a temporal order is found in a history of a user adding skills to a profile of the user. Users of the online service 100 can add skills they have to their profile, and often times skills are added in temporal ordering at different sessions. When most people added skill $s_i'$ later than $s_i$ on their profiles, it is more likely that skill is dependent upon skill Based on this assumption, the artificial intelligence component 114 may convert skill sequences into reference skill pairs for each user before repeating the same procedure for all skill pairs ($s_i$, $s_i'$) in Algorithm 1 to extract the most likely reference skill pairs for skill dependency.

Figure 4:
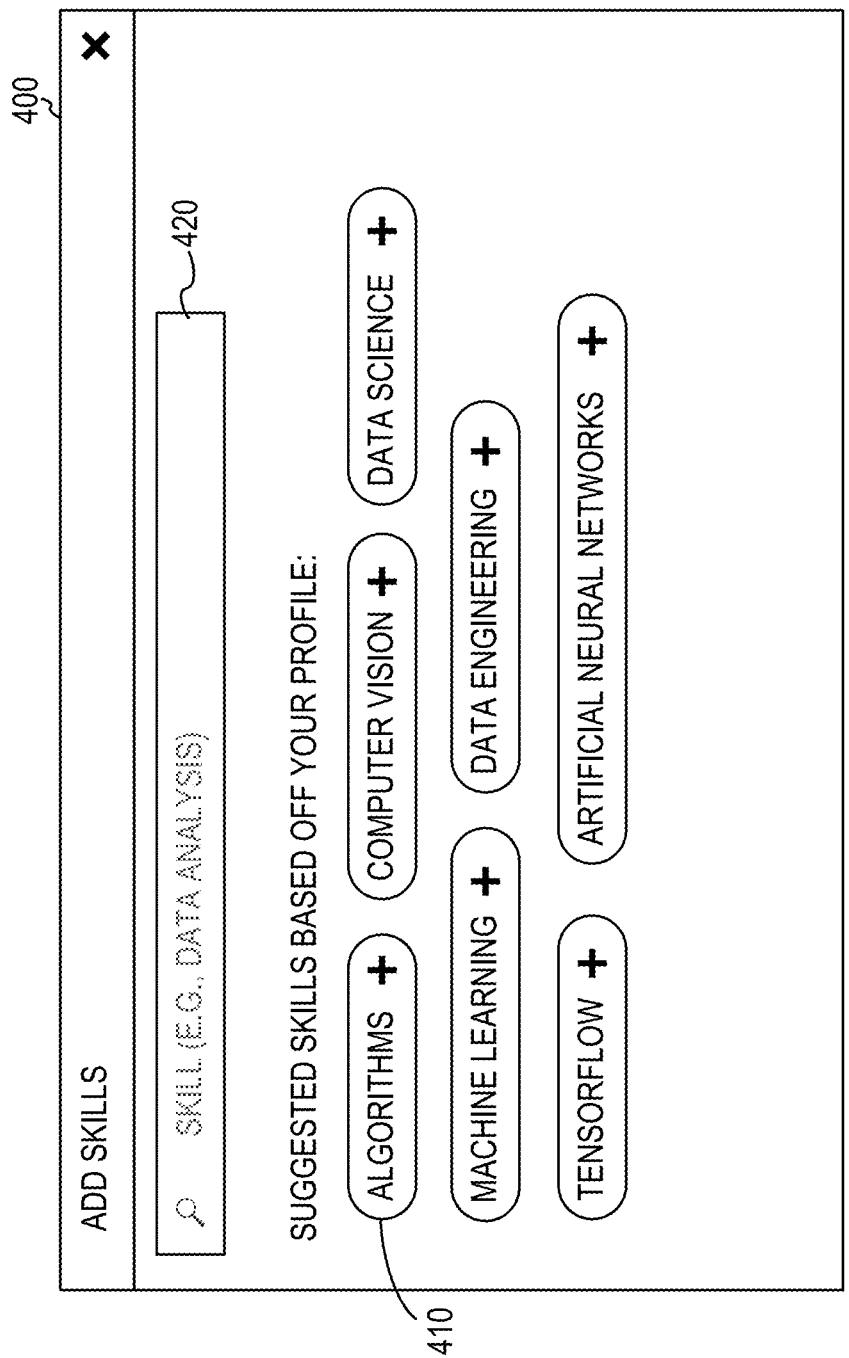
FIG. 4 illustrates a GUI in which a user may add one or more specialties to a profile of the user, in accordance with an example embodiment.

In some example embodiments, the same entity comprises a history of a user adding skills to a profile of the user. The profile may be stored in a database of the online service 100, such as in the database 116. FIG. 4 illustrates a GUI 400 in which a user may add one or more skills to a profile of the user, in accordance with an example embodiment. In the example shown in FIG. 4, the profile update service 112 displays the GUI 400, including a corresponding selectable user interface element 410 for each one of a plurality of skills. In some example embodiments, the selectable user interface element 410 is configured to trigger storing of the corresponding skill as part of a profile of the user in response to a selection of the corresponding selectable user interface element 410. For example, selection of the selectable user interface element 410 of one of the skills may result in the skill being stored in the database 116 in association with the profile of the user. Each time a user adds a skill to the profile of the user, such as via the GUI 400 in FIG. 4, the online service 100 may record instance of the user adding the skill as part of the history of the user adding skills to the profile of the user. The recorded instance may include the skill that was added and a corresponding timestamp for the addition. The history of the user adding skills to the profile of the user may be stored in and accessed from the database 116 or from the database 120.

In some example embodiments, the same entity comprises an online job posting that includes the first reference skill and the second reference skill. FIG. 5 illustrates a GUI 500 in which an online job posting is displayed, in accordance with an example embodiment. In FIG. 5, the job posting comprises headline information 510 and detailed information 512. The headline information 510 comprises basic information about the job posting, such as the job title or position (e.g., "SENIOR SOFTWARE DESIGNER"), the name of the company or organization seeking applicants for the job title or position (e.g., "LINKEDIN"), and the location of the job (e.g., "SAN FRANCISCO BAY AREA"). The detailed information 512 comprises more detailed information about the job, including, but not limited to, a job description, a seniority level of the job, one or more industries to which the job corresponds, an employment type for the job, and requirements for the job. In FIG. 5, the GUI 500 also comprises a selectable user interface element 520 configured to enable a user who is viewing the job posting to submit a job application for the job posting. In some example embodiments, the selectable user interface element 520 comprises a selectable button or link (e.g., the selectable "APPLY" button in FIG. 5) that is configured to, when selected, trigger the online service 100 to display another GUI in which the user can submit an application for the job posting. Other configurations of online job postings are also within the scope of the present disclosure. One or more skills may be included in the online job posting, such as part of the title, the job description, the industry, and the requirements for the job. In some example embodiments, the artificial intelligence component 114 may detect the co-occurrence of the first reference skill and the second reference skill in the same online job posting.

In some example embodiments, the artificial intelligence component 114 is configured to train a dependency model with a first machine learning algorithm using the training data. The dependency model may comprise a logistic regression model or a data gradient boosted decision tree (GBDT) model. However, other types of machine learning models may be used as the dependency model. The dependency model is trained to determine, given a target skill pair as an input, whether there is a dependency relation between the first target skill and the second target skill of the target skill pair.

In some example embodiments, the artificial intelligence component 114 is configured to train a Bidirectional Encoder Representations from Transformers (BERT) model with a second machine learning algorithm using the training data. However, other types of machine learning models may be used in place of the BERT model. BERT is a transformer-based machine learning technique for natural language processing. The BERT model is trained to determine the relation direction (e.g., which skill depends upon which skill) for a skill pair.

In some example embodiments, the artificial intelligence component 114 is configured to identify a corresponding dependency relation for each target skill pair in a plurality of target skill pairs using the dependency model. Each target skill pair in the plurality of target skill pairs may comprise a corresponding first target skill and a corresponding second target skill, where the corresponding dependency relation is between the corresponding first and second target skills of the corresponding target skill pair. The artificial intelligence component 114 may input the plurality of target skill pairs into the dependency model, and the dependency model may output, for each target skill pair, a classification of the target skill pair as either having a dependency relation or not having a dependency relation. For example, the dependency model may compute a probability value representing the probability that there is a dependency relation between the corresponding first target skill and the corresponding second target skill of the target skill pair, and then classify the target skill pair as having a dependency relation if the probability value satisfies a threshold value (e.g., if the probability value is equal to or greater than 0.5).

In some example embodiments, the artificial intelligence component 114 is configured to, for each target skill pair in the plurality of target skill pairs, determine a corresponding relation direction using the BERT model. The artificial intelligence component 114 may input the plurality of target skill pairs into the BERT model, and the BERT model may output, for each target skill pair, a classification of the direction of the dependency relation between the corresponding first target skill and the corresponding second target skill of the target skill pair. For example, the BERT model may generate an output that either classifies the first target skill as depending on the second target skill or classifies the second target skill as depending on the first target skill.

In some example embodiments, one or more of the application components 106 are configured to use the corresponding identified dependency relation and determined relation direction for at least a portion of the plurality of target skill pairs in an application of the online service 100. For example, the online service 100 may use the corresponding identified dependency relation and determined relation direction for at least a portion of the plurality of target skill pairs in one or more of the application components 106.

In some example embodiments, the online service 100 uses the corresponding identified dependency relation and determined relation direction for at least a portion of the plurality of target skill pairs in the profile update service 112. For example, the profile update service 112 may determine that a profile of a target user of the online service 100 includes the corresponding first target skill of each target skill pair in the at least a portion of the plurality of target skill pairs. The profile update service 112 may then select the corresponding second target skill of each target skill pair in the at least a portion of the plurality of target skill pairs based on the corresponding identified dependency relation and determined relation direction for the at least a portion of the plurality of target skill pairs, and display, on a computing device of the target user, a corresponding selectable user interface element for each selected second target skill in the at least a portion of the plurality of target skill pairs, such as previously discussed with respect to FIG. 4. The corresponding selectable user interface element may be configured to trigger storing of the corresponding second target skill as part of the profile of the target user in response to a selection of the corresponding selectable user interface element.

In some example embodiments, the online service 100 uses the corresponding identified dependency relation and determined relation direction for at least a portion of the plurality of target skill pairs in presenting recommendations of online job postings to a target user. For example, the recommendation application 110 may determine that a profile of a target user of the online service 100 includes the corresponding first target skill of each target skill pair in the at least a portion of the plurality of target skill pairs, and also determine that an online job posting includes the corresponding second target skill of each target skill pair in the at least a portion of the plurality of target skill pairs. Next, the recommendation application 110 may select the online job posting based on the determination that the profile of the target user includes the corresponding first target skill of each target skill pair in the at least a portion of the plurality of target skill pairs, the determination that the online job posting includes the corresponding second target skill of each target skill pair in the at least a portion of the plurality of target skill pairs, and the corresponding identified dependency relation and determined relation direction for the at least a portion of the plurality of target skill pairs. Then, the recommendation application 110 may display, on a computing device of the target user, a corresponding selectable user interface element for the online job posting based on the selecting the online job posting. The corresponding selectable user interface element may be configured to, in response to its selection, trigger a display of details of the online job posting on the computing device of the target user or initiate an online application process for the online job posting on the computing device of the target user.

Figure 6:
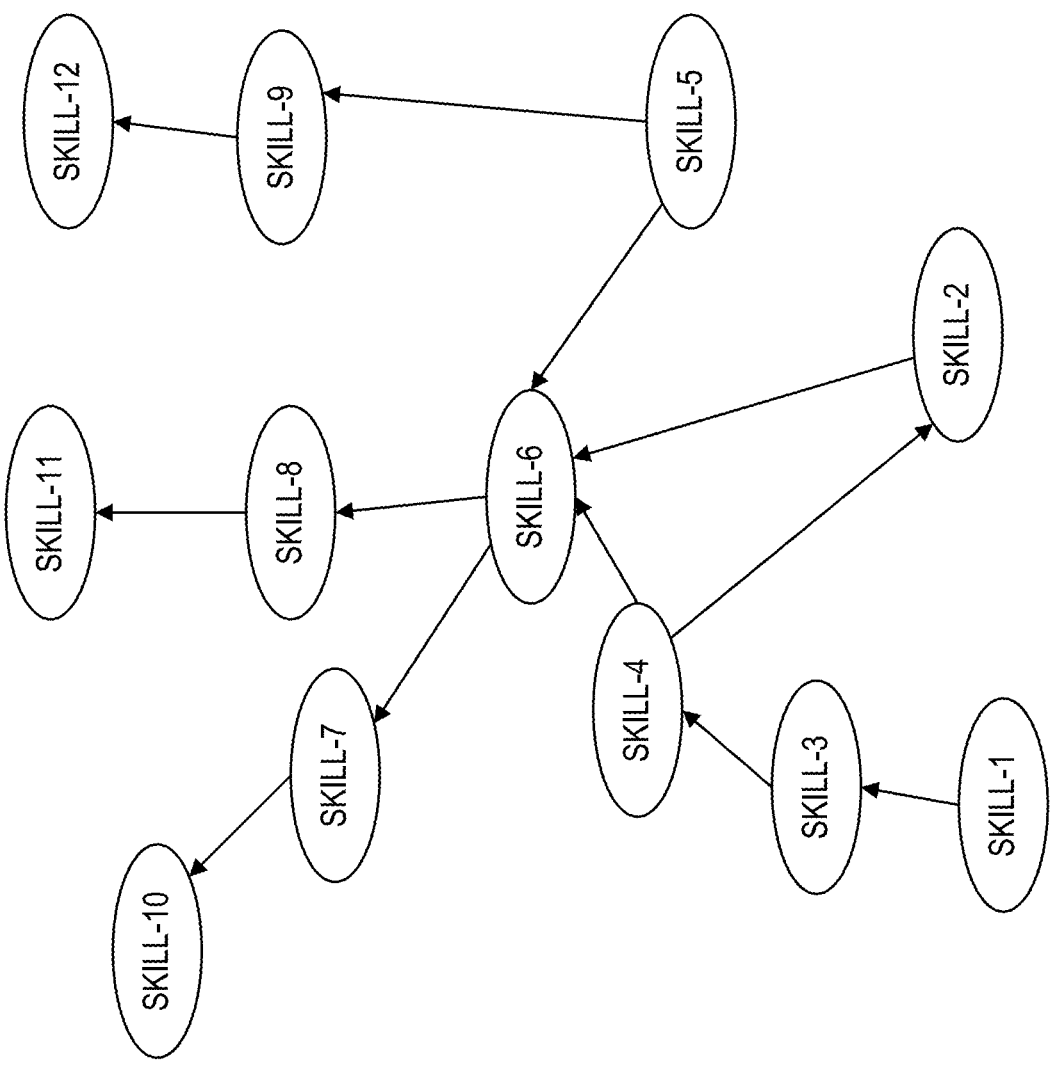
FIG. 6 illustrates a directed graph, in accordance with an example embodiment.

In some example embodiments, the artificial intelligence component 114 is configured to generate a directed graph using the corresponding identified dependency relation and determined relation direction for the plurality of target skill pairs. FIG. 6 illustrates a directed graph 600, in accordance with an example embodiment. The directed graph 600 comprises a plurality of vertices representing skills (e.g., skill-1, skill-2, . . . , skill-12 in FIG. 6). The directed graph 600 also includes directed edges representing the relation direction between skills. For example, in FIG. 6, the directed edge going from skill-1 to skill-3 represents skill-3 depending on skill-1, but not skill-1 depending on skill-3. In some example embodiments, the online service 100 uses the following Algorithm 2 to generate the directed graph:

---

Require: skill pairs S = {($s_i$, $s_{i'}$)} that satisfies $s_i$ → $s_{i'}$,
   confidence score $x_{ii'}$ for each edge $s_i$ → $s_{i'}$ from stage 1 model
Ensure: a directed acyclic graph G = (V, E), where Vertexes are $s_i$ from S
   and Edges connect from $s_i$ to $s_{i'}$
- for skill pair ($s_i$, $s_{i'}$) ∈ S = {($s_i$, $s_{i'}$)}:
   - add the edge $s_i$ → $s_{i'}$ to E, node $s_i$, $s_{i'}$ to V.
- for $s_i$ ∈ V :
   - start from $s_i$ and detect cycles C in G = (V, E) using DFS
   - store edge to cycle information for all edges $e_i$ that forms a cycle:
     I = {$e_i$ : {$C_k$ : $e_i$ ∈ $C_k$}}, where $C_k$ are all cycles containing $e_i$ edge
- sort edges in I according to their confidence scores from smallest to largest
- for $s_i$ → $s_{i'}$ ∈ I :
   - if I [$s_i$ → $s_{i'}$] ≠ 0 : throw away edge $s_i$ → $s_{i'}$ and update I by deleting cycles that contains $s_i$
- Return G

---

In Algorithm 2, the input is all of the identified skill pairs S in a directed dependency relationship, where each skill pair comes with a confidence score from the dependency model, denoting how likely it is that a dependency relationship can be inferred between them. First, the artificial intelligence component 114 adds all skills from S to obtain a list of nodes V. Then, the artificial intelligence component 114 constructs a directed edge $E_i$ from $s_i$ to $s_i'$ and adds all directed edges from skill pairs S to obtain a list of edges E, thereby obtaining a directed graph G(V, E), which may contain cycles. The artificial intelligence component 114 may perform pruning to remove the cycles. For each node in V, the artificial intelligence component 114 starts traversing the directed graph with depth first search (DFS) and stores all edges that can form a cycle in a map I, where the key is the edge, and the value is a list of cycles this edge is part of. The artificial intelligence component 114 sorts the edges in I by the confidence score from the dependency model in ascending order. Then, the artificial intelligence component 114 starts removing the edge with the lowest score in I and update the cycles in I every time an edge is removed, until no cycle is left, resulting in a directed acyclic graph. The artificial intelligence component 114 may generate the directed graph using other algorithms as well.

In some example embodiments, the online service 100 uses the corresponding identified dependency relation and determined relation direction for at least a portion of the plurality of target skill pairs in presenting recommendations of online courses to a target user. For example, the recommendation application 110 may determine that a profile of a target user of the online service includes the corresponding first target skill of each target skill pair in the at least a portion of the plurality of target skill pairs, and also determines that an online course includes the corresponding second target skill of each target skill pair in the at least a portion of the plurality of target skill pairs. Next, the recommendation application 110 may select the online course based on the determining that the profile of the target user includes the corresponding first target skill of each target skill pair in the at least a portion of the plurality of target skill pairs, the determining that the online course includes the corresponding second target skill of each target skill pair in the at least a portion of the plurality of target skill pairs, and the corresponding identified dependency relation and determined relation direction for the at least a portion of the plurality of target skill pairs. The recommendation application 110 may then display, on a computing device of the target user, a corresponding selectable user interface element for the online course based on the selecting the online course. The corresponding selectable user interface element may be configured to, in response to its selection, trigger a playing of a multimedia file of the online course on the computing device or initiate an online process for playing the multimedia file of the online course on the computing device.

Figure 7:
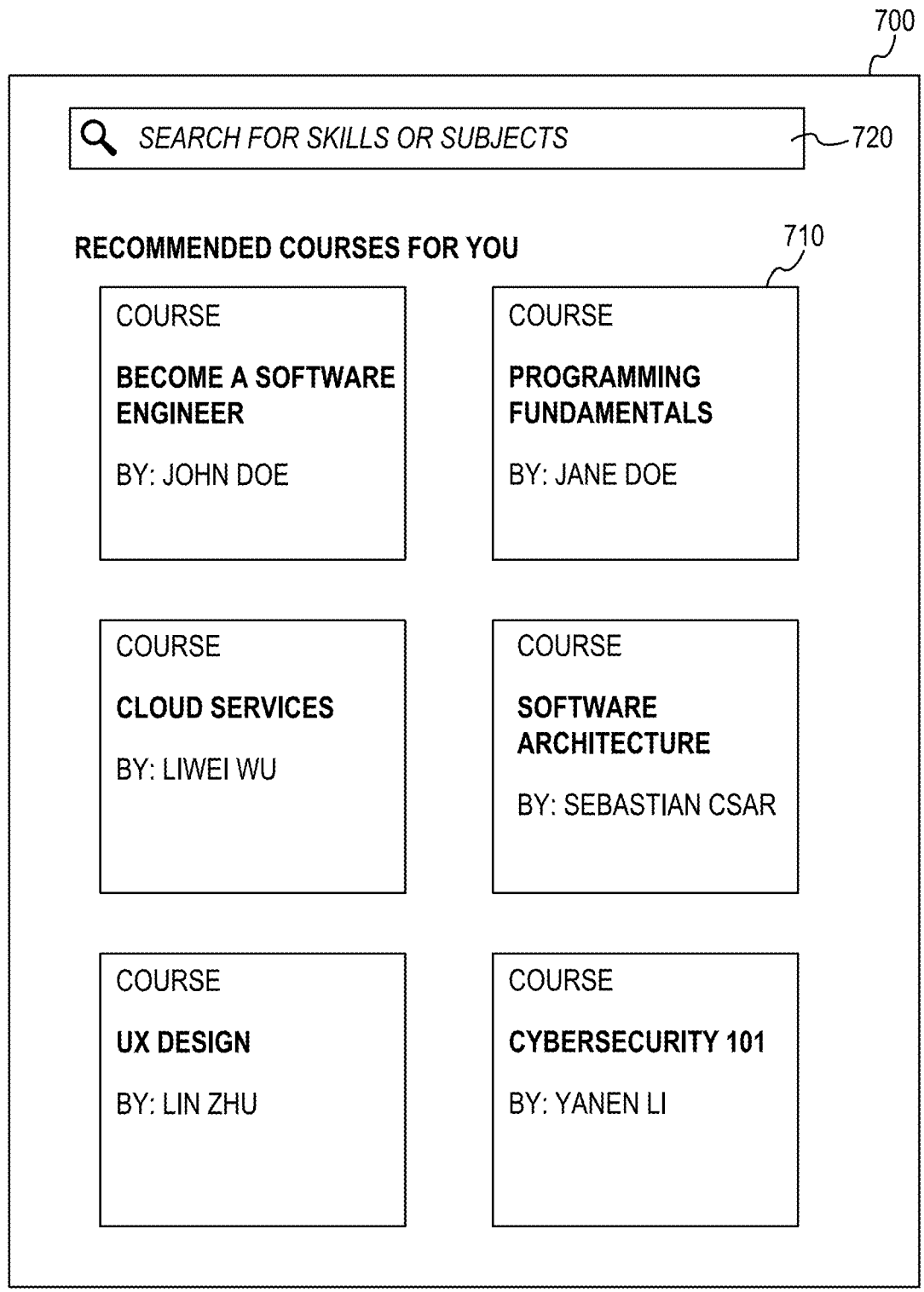
FIG. 7 illustrates a GUI in which selectable user interface elements for online courses are displayed, in accordance with an example embodiment.

FIG. 7 illustrates a GUI 700 in which selectable user interface elements for online courses are displayed, in accordance with an example embodiment. The GUI 700 may display indications 710 of online courses, such as the names and other details of the online courses. In some example embodiments, each indication 710 comprises a corresponding selectable user interface element configured to, in response to its selection, trigger an online process for playing the online course on the computing device of the target user. The GUI 700 may also include a search field 720 configured to receive a search query from a user. In response to the search query, the search engine 108 may generate search results for the search query. For example, the user may enter one or more skills or subjects for which the user would like to view an online course and submit the entered skill(s) or subject(s) as a search query. The search engine 108 may then perform a search of available online courses using the submitted search query and return matching online courses as search results in the GUI 700.

Figure 8:
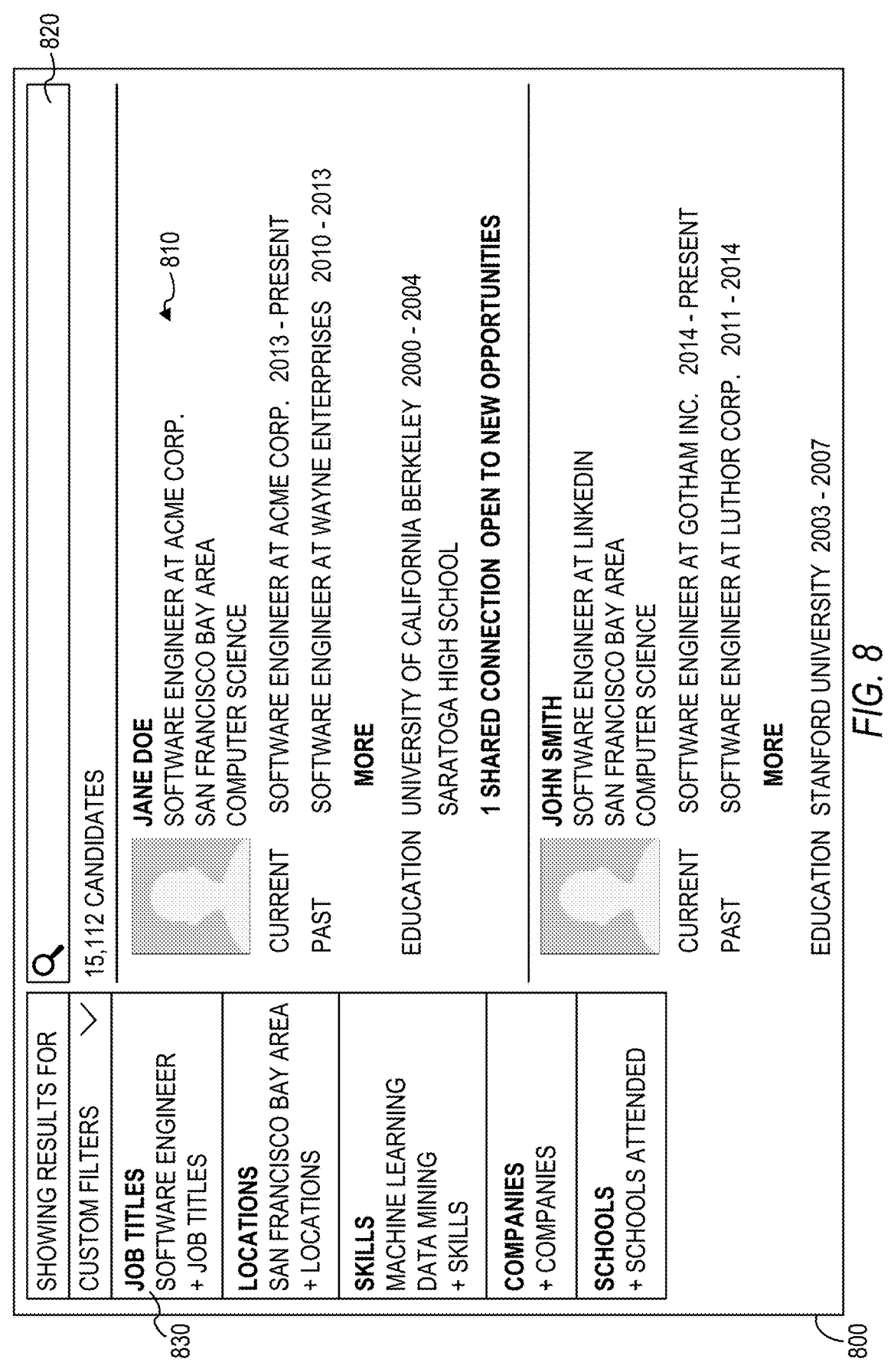

In some example embodiments, the online service 100 uses the corresponding identified dependency relation and determined relation direction for at least a portion of the plurality of target skill pairs in presenting search results to a searching user, such as by displaying potential job candidates to a recruiter. For example, the search engine 108 may receive a search query submitted by a second target user, such as a recruiter. The search query may include the second target skill of a target skill pair. In the example, although a profile of a first target user does not include the second target skill, the profile of the first target user includes a first target skill, which forms the target skill pair along with the second target skill. The search engine 108 may select the profile of the first target user as a search result for the search query based on a determination that the profile of the first target user includes the first target skill, a determination that there is a dependency relation between the first target skill and the second target skill, and a determination that a relation direction of the target skill pair comprises the first target skill being dependent on the second target skill. In this example, despite the profile of the first target user not including the second target skill of the search query, the search engine 108 still selects the profile of the first target user because the inclusion of the first target skill in the profile of the first target user is predictive of the first target user actually having the second target skill because the first target skill depends on the second target skill according to the dependency relation and the relation direction of the target skill pair. In other words, although the profile of the first target user does not include the second target skill, the search engine 108 may treat the profile of the first target user as including the second target skill based on the dependency relation and the relation direction of the target skill pair. The search engine 108 may then display, on a computing device of the second target user, a user interface element that identifies the profile of the first target user based on selecting the profile of the first target user, such as shown in FIG. 8. In the example above, if the relation direction of the target skill pair comprises the second target skill being dependent on the first target skill instead of the first target skill being dependent on the second target skill, the search engine 108 does not treat the profile of the first target user as including the second target skill even though a dependency relation between the first target skill and the second target skill has been identified, since the relation direction of the target skill pair may indicate an order in which the first target skill and the second target skill occur, such as an order in which the first target skill and the second target skill are learned or acquired.

FIG. 8 illustrates a GUI 800 in which user interface elements that identify profiles of users are displayed, in accordance with an example embodiment. In some example embodiments, the search engine 108 is configured to select profiles of users that are potential job candidates based at least in part on a search query submitted by a user who is searching (referred to as a "searching user") for potential job candidates, and to cause the selected profiles of the users to be displayed on a search results page of the GUI 800 to the searching user. In the GUI 800, the searching user (e.g., a recruiter) may submit one or more terms of a search query using one or more user interface elements. For example, the searching user may submit the term(s) by either entering text into a search field 820 or by using a custom search filters panel 830 via which the searching user may select and enter the terms based on the corresponding category of the terms (e.g., job titles, locations, skills, companies, schools). In response to the search query submitted by the searching user, the search engine 108 may cause user interface elements 810 that identify the selected profiles to be displayed on the search results page. As previously discussed above, despite a profile of a target user not including a second target skill of a search query, the search engine 108 may still select the profile of the target user based on a first target skill being included in the profile of the target user and the first target skill being dependent on the second target skill according to the dependency relation and the relation direction of the first target skill and the second target skill.

Figure 9:
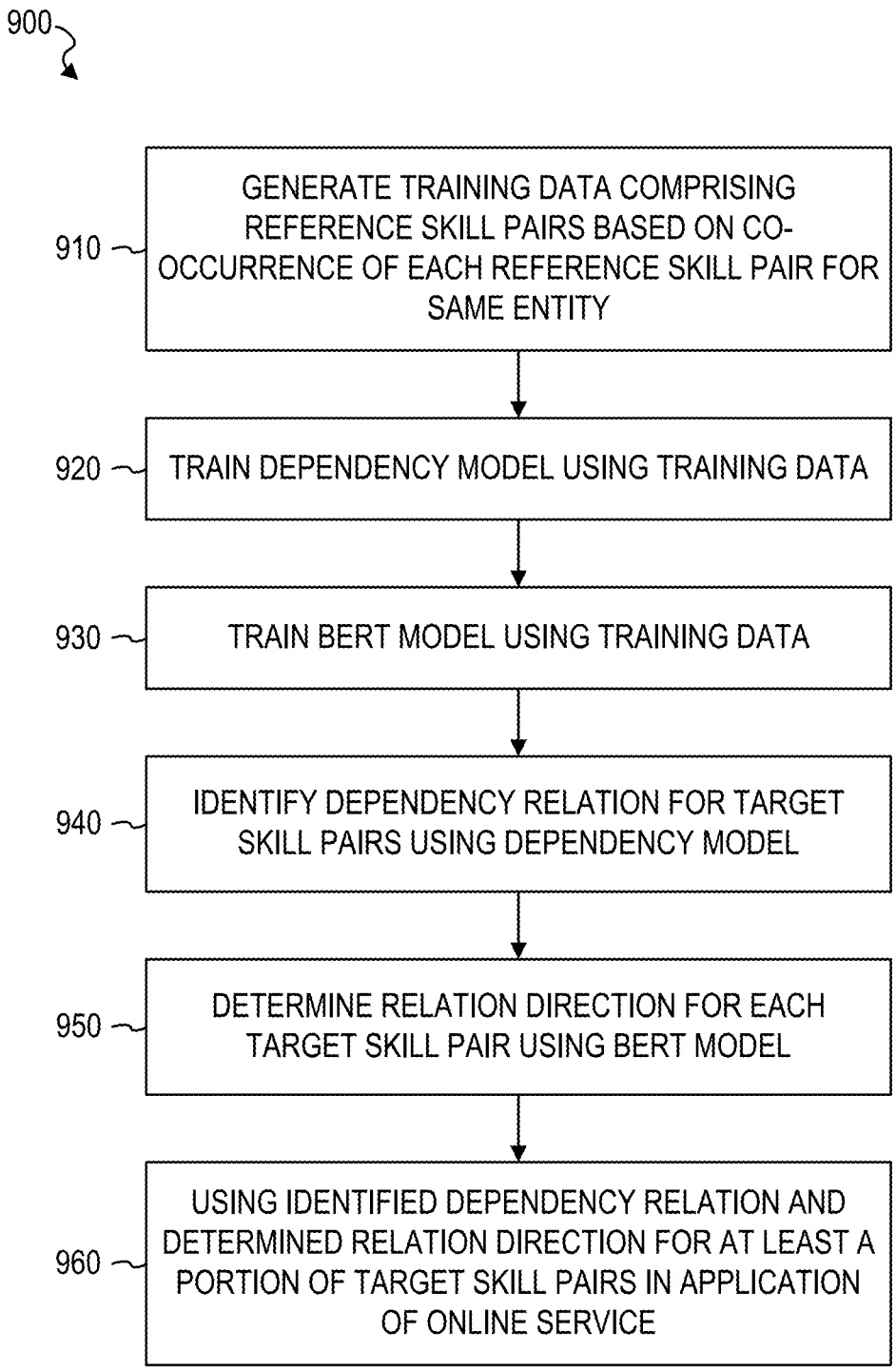
FIG. 9 is a flowchart illustrating a method of training artificial intelligence models for use in determining dependency relations, in accordance with an example embodiment.

FIG. 9 is a flowchart illustrating a method 900 of training artificial intelligence models for use in determining dependency relations, in accordance with an example embodiment. The method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by the online service 100 of FIG. 1, or any combination of one or more of its components (e.g., the artificial intelligence component 114, the application component 106), as described above.

At operation 910, the online service 100 generates, or otherwise obtains, training data comprising a plurality of reference skill pairs, with each reference skill pair comprising a corresponding first reference skill and a corresponding second reference skill. In some example embodiments, the plurality of reference skill pairs are included in the training data based on a co-occurrence of the corresponding first and second reference skills for each reference skill pair in the plurality of reference skill pairs. The co-occurrence may comprise the corresponding first and second reference skills co-occurring for a same entity, such that the plurality of reference skill pairs are included in the training data based on a determination that the corresponding first reference skill occurred for an entity and a determination that the corresponding second reference skill occurred for the same entity as the corresponding first reference skill.

In some example embodiments, the plurality of reference skill pairs being included in the training data is further based on a corresponding indication of a temporal order of the corresponding first and second reference skills for the same entity for each reference skill pair in the plurality of reference skill pairs. For example, the plurality of reference skill pairs may be included in the training data based on an indication of a chronological sequence including the occurrence of the corresponding first reference skill for an entity and the occurrence of the corresponding second reference skill for the same entity. Examples of the indication of the chronological sequence include, but are not limited to, a sequential playlist of online courses available to users for viewing, a history of online courses that have been watched by a user, and a history of a user adding skills to a profile of the user. These examples will be discussed in further detail below.

In some example embodiments, the same entity comprises a sequential playlist of online courses available to users for viewing via the online service. For example, the same entity may comprise the sequential playlist discussed above with respect to FIG. 3. The first reference skill may be associated with a first online course in the sequence of online courses, and the second reference skill may be associated with a second online course in the sequence of online courses. The sequential playlist of online courses may be stored in and accessed from a database of the online service 100.

In some example embodiments, the same entity comprises a history of online courses that have been watched by a user of the online service. The history of online courses may be stored in association with the user, where the first reference skill is associated with a first online course in the history of online courses and the second reference skill is associated with a second online course in the history of online courses. The history of online courses that have been watched by the user may be stored in and accessed from the database 120.

In some example embodiments, the same entity comprises a history of a user adding skills to a profile of the user. The profile may be stored in a database of the online service 100, such as in the database 116. In one example, each time a user adds a skill to the profile of the user, such as via the GUI 400 in FIG. 4, the online service 100 may record instance of the user adding the skill as part of the history of the user adding skills to the profile of the user. The recorded instance may include the skill that was added and a corresponding timestamp for the addition. The history of the user adding skills to the profile of the user may be stored in and accessed from the database 116 or from the database 120.

In some example embodiments, the same entity comprises an online job posting that includes the first reference skill and the second reference skill. For example, the same entity may comprise the online job posting displayed in the GUI 500 of FIG. 5. Other configurations of online job postings are also within the scope of the present disclosure.

At operation 920, the online service 100 trains a dependency model with a first machine learning algorithm using the training data. In some example embodiments, the dependency model comprises a logistic regression model or a data gradient boosted decision tree (GBDT) model. However, other types of machine learning models may be used as the dependency model. The training data includes the plurality of reference skill pairs, which are used in the training of the dependency model as positive examples of skill pairs having a dependency relation. As a result of the training, the dependency model may be trained to classify a given target skill pair as either having a dependency relation or not having a dependency relation.

At operation 930, the online service 100 trains a Bidirectional Encoder Representations from Transformers (BERT) model with a second machine learning algorithm using the training data. However, other types of machine learning models may be used in place of the BERT model. The training data includes the plurality of reference skill pairs, which are used in the training of the BERT model as positive examples of relation directions for dependency relations. The second machine learning algorithm may use the order in which the first reference skill and the second reference skill of each reference skill pair are provided to determine the direction of the relation direction. For example, for a first reference skill $s_i$ and a second reference skill $s_j$, a reference skill pair ($s_i$, $s_j$) may be used as a positive example of a relation direction, while the same references skills provided in a different order ($s_j$, $s_i$) may be omitted from use as a positive example of a relation direction, as the dependency between the first reference skill $s_i$ and the second reference skill $s_j$ may only be in one direction, such as $s_i$ being dependent on $s_j$, but $s_j$ not being dependent on $s_i$.

At operation 940, the online service 100 identifies a corresponding dependency relation for each target skill pair in a plurality of target skill pairs using the dependency model. In some example embodiments, each target skill pair in the plurality of target skill pairs comprises a corresponding first target skill and a corresponding second target skill, where the corresponding dependency relation is between the corresponding first and second target skills of the corresponding target skill pair. The online service 100 may input the plurality of target skill pairs into the dependency model, and the dependency model may output, for each target skill pair, a classification of the target skill pair as either having a dependency relation or not having a dependency relation. For example, the dependency model may compute a probability value representing the probability that there is a dependency relation between the corresponding first target skill and the corresponding second target skill of the target skill pair, and then classify the target skill pair as having a dependency relation if the probability value satisfies a threshold value (e.g., if the probability value is equal to or greater than 0.5).

At operation 950, the online service 100, for each target skill pair in the plurality of target skill pairs, determines a corresponding relation direction using the BERT model. The online service 100 may input the plurality of target skill pairs into the BERT model, and the BERT model may output, for each target skill pair, a classification of the direction of the dependency relation between the corresponding first target skill and the corresponding second target skill of the target skill pair. For example, the BERT model may generate an output that either classifies the first target skill as depending on the second target skill or classifies the second target skill as depending on the first target skill.

By using a two-stage approach in which the dependency model is used in a first stage to identify dependency relations and the BERT model is used in a second stage to determine a relation direction of the identified dependency relations, the online service 100 improves and maximizes accuracy and speed. While the BERT model is very accurate in identifying dependency relations, testing by the inventors of the present disclosure has indicated that the dependency model of the present disclosure is significantly faster than the BERT model in identifying dependency relations. Given the billions of potential target skill pairs to be processed, the use of the dependency model greatly improves the scalability of identifying dependency relations. The online service 100 uses the speed and scalability of the dependency model to identify target skill pairs that have dependency relations. The identified target skill pairs may then be fed into the BERT model to determine the relation directions, thereby using the accuracy of the BERT model to process a reduced workload provided by the dependency model.

At operation 960, the online service 100 uses the corresponding identified dependency relation and determined relation direction for at least a portion of the plurality of target skill pairs in an application of the online service 100. For example, the online service 100 may use the corresponding identified dependency relation and the determined relation direction for at least a portion of the plurality of target skill pairs in one or more of the application components 106.

In some example embodiments, the online service 100 uses the corresponding identified dependency relation and determined relation direction for at least a portion of the plurality of target skill pairs in the profile update service 112. For example, the profile update service 112 may determine that a profile of a target user of the online service 100 includes the corresponding first target skill of each target skill pair in the at least a portion of the plurality of target skill pairs. The profile update service 112 may then select the corresponding second target skill of each target skill pair in the at least a portion of the plurality of target skill pairs based on the corresponding identified dependency relation and determined relation direction for the at least a portion of the plurality of target skill pairs, and displaying, on a computing device of the target user, a corresponding selectable user interface element for each selected second target skill in the at least a portion of the plurality of target skill pairs, such as previously discussed with respect to FIG. 4. The corresponding selectable user interface element may be configured to trigger storing of the corresponding second target skill as part of the profile of the target user in response to a selection of the corresponding selectable user interface element.

In some example embodiments, the online service 100 uses the corresponding identified dependency relation and determined relation direction for at least a portion of the plurality of target skill pairs in presenting recommendations of online job postings to a target user. For example, an online job posting may include the second target skill of a target skill pair. In the example, although a profile of a first target user does not include the second target skill, the profile of the first target user includes a first target skill, which forms the target skill pair along with the second target skill. The recommendation application 110 may select the online job posting to be recommended to the first target user based on a determination that the profile of the first target user includes the first target skill, a determination that there is a dependency relation between the first target skill and the second target skill, and a determination that a relation direction of the target skill pair comprises the first target skill being dependent on the second target skill. In this example, despite the profile of the first target user not including the second target skill of the online job posting, the recommendation application 110 still selects the online job posting because the inclusion of the first target skill in the profile of the first target user is predictive of the first target user actually having the second target skill because the first target skill depends on the second target skill according to the dependency relation and the relation direction of the target skill pair. In other words, although the profile of the first target user does not include the second target skill, the recommendation application may treat the profile of the first target user as including the second target skill based on the dependency relation and the relation direction of the target skill pair. Then, the recommendation application 110 may display, on a computing device of the first target user, a corresponding selectable user interface element for the online job posting based on the selecting of the online job posting. The corresponding selectable user interface element may be configured to, in response to its selection, trigger a display of details of the online job posting on the computing device of the target user or initiate an online application process for the online job posting on the computing device of the target user. In the example above, if the relation direction of the target skill pair comprises the second target skill being dependent on the first target skill instead of the first target skill being dependent on the second target skill, the recommendation engine 110 does not treat the profile of the first target user as including the second target skill even though a dependency relation between the first target skill and the second target skill has been identified, since the relation direction of the target skill pair may indicate an order in which the first target skill and the second target skill occur, such as an order in which the first target skill and the second target skill are learned or acquired.

In some example embodiments, the online service 100 uses the corresponding identified dependency relation and determined relation direction for at least a portion of the plurality of target skill pairs in presenting recommendations of online courses to a target user. For example, an online course may include the second target skill of a target skill pair. In the example, although a profile of a first target user does not include the second target skill, the profile of the first target user includes a first target skill, which forms the target skill pair along with the second target skill. The recommendation application 110 may select the online course to be recommended to the first target user based on a determination that the profile of the first target user includes the first target skill, a determination that there is a dependency relation between the first target skill and the second target skill, and a determination that a relation direction of the target skill pair comprises the second target skill being dependent on the first target skill. In this example, despite the profile of the first target user not including the second target skill of the online course, the recommendation application 110 still selects the online course because the inclusion of the first target skill in the profile of the first target user is predictive of the first target next acquiring the second target skill next because the second target skill depends on the first target skill according to the dependency relation and the relation direction of the target skill pair. The recommendation application 110 may then display, on a computing device of the target user, a corresponding selectable user interface element for the online course based on the selecting the online course, such as shown in FIG. 7. The corresponding selectable user interface element may be configured to, in response to its selection, trigger a playing of a multimedia file of the online course on the computing device or initiate an online process for playing the multimedia file of the online course on the computing device.

In some example embodiments, the online service 100 uses the corresponding identified dependency relation and determined relation direction for at least a portion of the plurality of target skill pairs in presenting search results to a searching user, such displaying potential job candidates to a recruiter, as previously discussed. The search engine 108 may then display, on a computing device of the second target user, a user interface element that identifies the profile of the first target user based on the selecting the profile of the first target user, such as shown in FIG. 8.

It is contemplated that any of the other features described within the present disclosure can be incorporated into the method 900.

Figure 10:
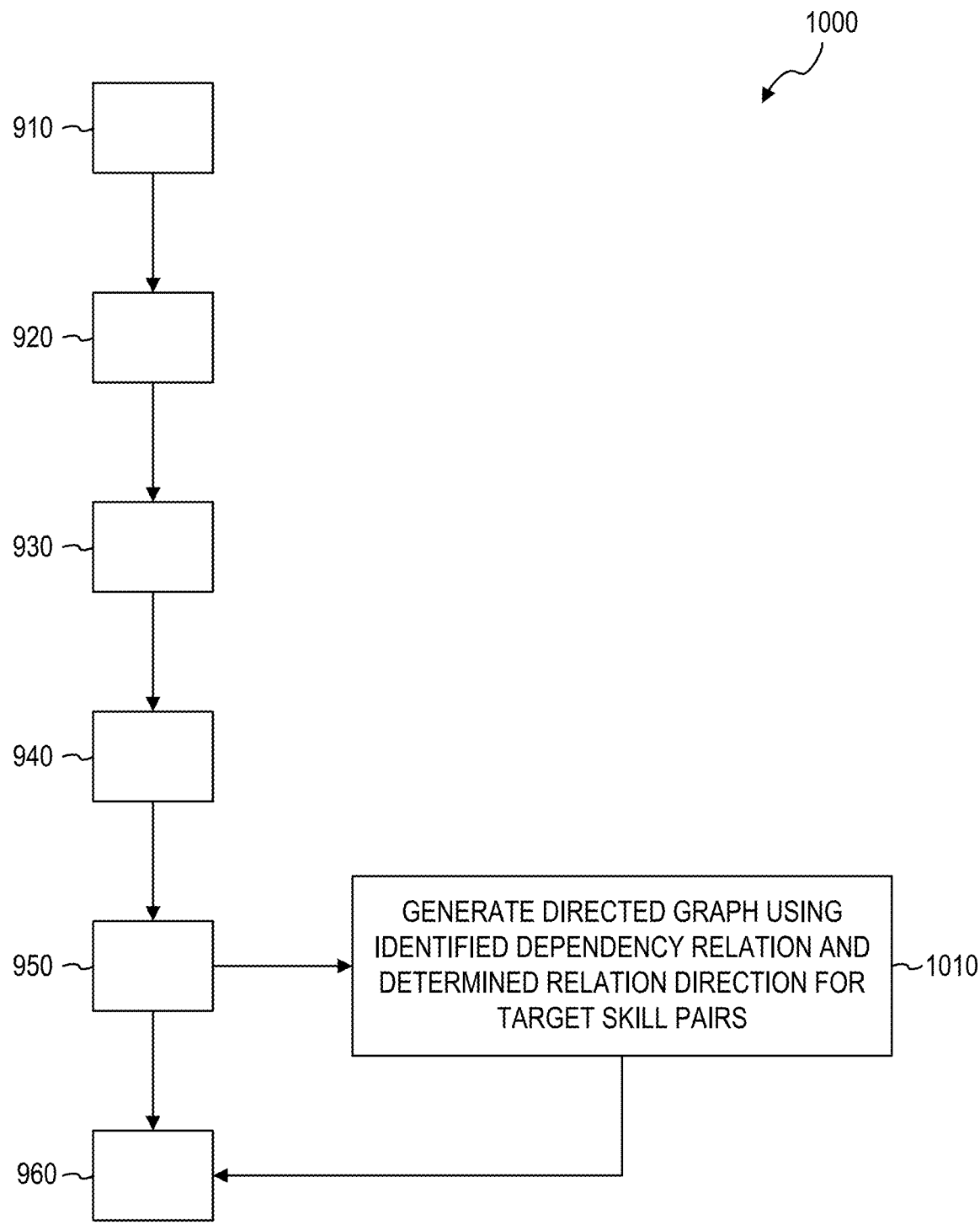
FIG. 10 is a flowchart illustrating another method of training artificial intelligence models for use in determining dependency relations, in accordance with an example embodiment.

FIG. 10 is a flowchart illustrating another method 1000 of training artificial intelligence models for use in determining dependency relations, in accordance with an example embodiment. The method 1000 can be performed by processing logic that can comprise hardware (e.g., circuitry, dedicated logic, programmable logic, microcode, etc.), software (e.g., instructions run on a processing device), or a combination thereof. In one implementation, the method 1000 is performed by the online service 100 of FIG. 1, or any combination of one or more of its components (e.g., the artificial intelligence component 114, the application component 106), as described above. The method 1000 may include an operation 1010 being performed after operation 950 and prior to operation 960 of the method 900 of FIG. 9.

At operation 1010, the online service 100 generates a directed graph using the corresponding identified dependency relation and determined relation direction for the plurality of target skill pairs. For example, the online service 100 may generate the directed graph 600 discussed above with respect to FIG. 6. Then, the method 1000 may proceed to operation 960, where the online service 100 may use the at least a portion of the plurality of target skills in the application of the online service 100 by using the directed graph in the application of the online service 100. In some example embodiments, the online service 100 uses Algorithm 2, discussed above, to generate the directed graph. However, the online service 100 may generate the directed graph using other algorithms as well.

It is contemplated that any of the other features described within the present disclosure can be incorporated into the method 1000.

Certain embodiments are described herein as including logic or a number of components or mechanisms. Components may constitute either software components (e.g., code embodied (1) on a non-transitory machine-readable medium or (2) in a transmission signal) or hardware-implemented components. A hardware-implemented component is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented component that operates to perform certain operations as described herein.

In various embodiments, a hardware-implemented component may be implemented mechanically or electronically. For example, a hardware-implemented component may comprise dedicated circuitry or logic that is permanently configured (e.g., as a special-purpose processor, such as a field programmable gate array (FPGA) or an application-specific integrated circuit (ASIC)) to perform certain operations. A hardware-implemented component may also comprise programmable logic or circuitry (e.g., as encompassed within a programmable processor) that is temporarily configured by software to perform certain operations. It will be appreciated that the decision to implement a hardware-implemented component mechanically, in dedicated and permanently configured circuitry, or in temporarily configured circuitry (e.g., configured by software) may be driven by cost and time considerations.

Accordingly, the term "hardware-implemented component" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented components are temporarily configured (e.g., programmed), each of the hardware-implemented components need not be configured or instantiated at any one instance in time. For example, where the hardware-implemented components comprise a processor configured using software, the processor may be configured as respective different hardware-implemented components at different times. Software may accordingly configure a processor, for example, to constitute a particular hardware-implemented component at one instance of time and to constitute a different hardware-implemented component at a different instance of time.

Hardware-implemented components can provide information to, and receive information from, other hardware-implemented components. Accordingly, the described hardware-implemented components may be regarded as being communicatively coupled. Where multiple of such hardware-implemented components exist contemporaneously, communications may be achieved through signal transmission (e.g., over appropriate circuits and buses) that connect the hardware-implemented components. In embodiments in which multiple hardware-implemented components are configured or instantiated at different times, communications between such hardware-implemented components may be achieved, for example, through the storage and retrieval of information in memory structures to which the multiple hardware-implemented components have access. For example, one hardware-implemented component may perform an operation, and store the output of that operation in a memory device to which it is communicatively coupled. A further hardware-implemented component may then, at a later time, access the memory device to retrieve and process the stored output. Hardware-implemented components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions. The components referred to herein may, in some example embodiments, comprise processor-implemented components.

Similarly, the methods described herein may be at least partially processor-implemented. For example, at least some of the operations of a method may be performed by one or more processors or processor-implemented components. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a component, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 11:
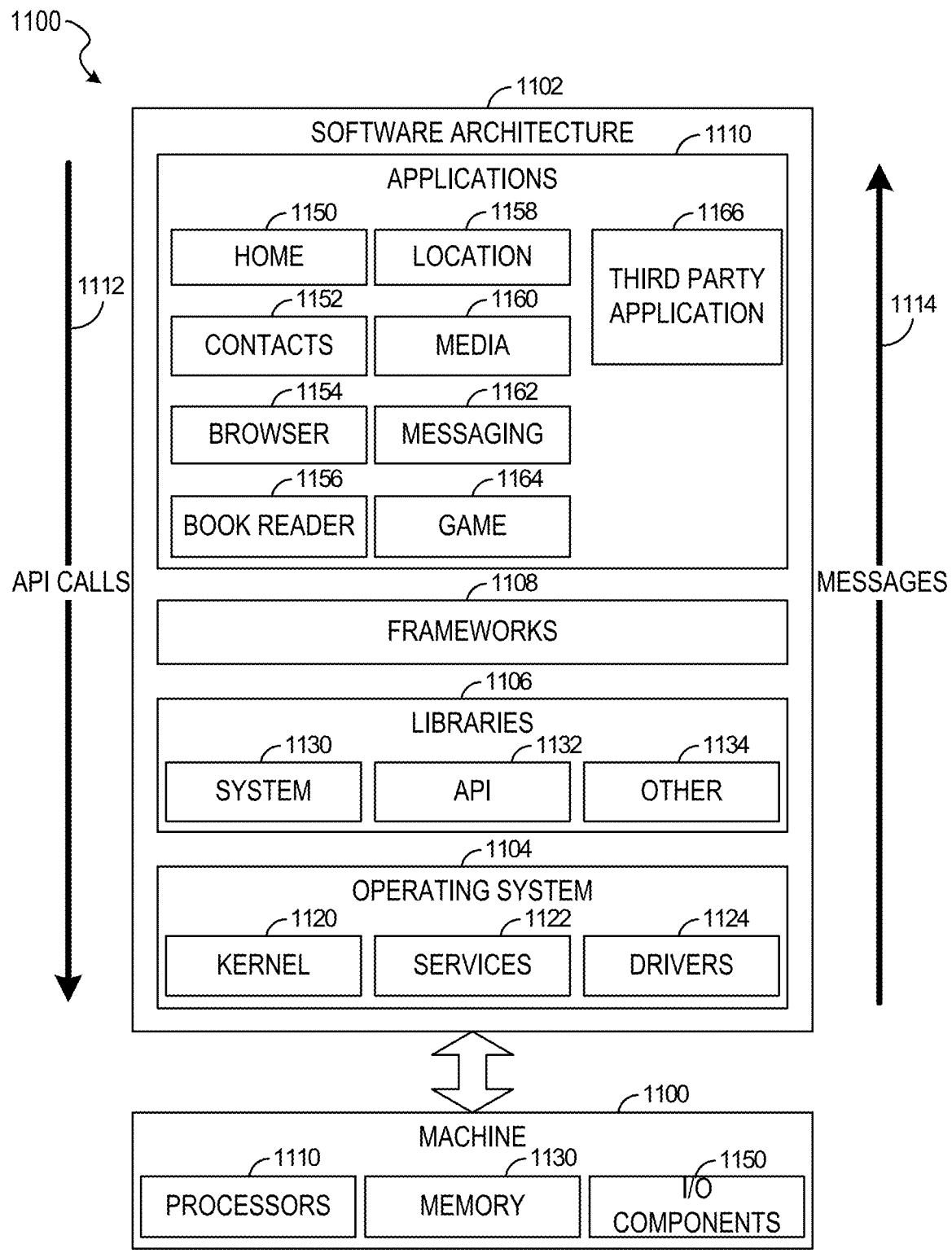
FIG. 11 is a block diagram illustrating a software architecture, in accordance with an example embodiment.

FIG. 11 is a block diagram 1100 illustrating a software architecture 1102, which can be installed on any one or more of the devices described above. FIG. 11 is merely a non-limiting example of a software architecture, and it will be appreciated that many other architectures can be implemented to facilitate the functionality described herein. In various embodiments, the software architecture 1102 is implemented by hardware such as a machine 1200 of FIG. 12 that includes processors 1110, memory 1130, and input/output (I/O) components 1150. In this example architecture, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke API calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various GUI functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications, such as a third-party application 1166. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
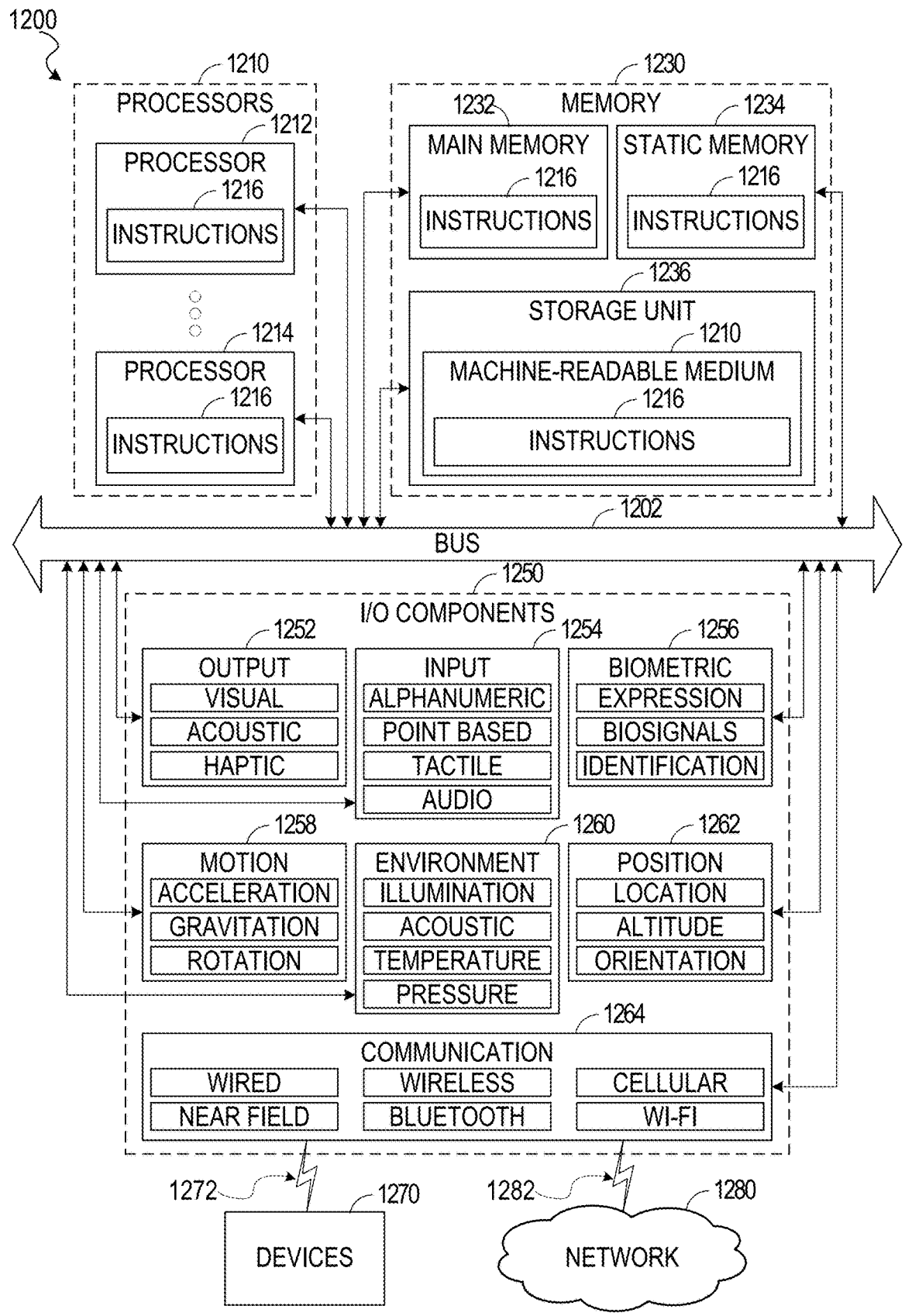
FIG. 12 illustrates a diagrammatic representation of a machine in the form of a computer system within which a set of instructions may be executed for causing the machine to perform any one or more of the methodologies discussed herein, in accordance with an example embodiment.

FIG. 12 illustrates a diagrammatic representation of a machine 1200 in the form of a computer system within which a set of instructions may be executed for causing the machine 1200 to perform any one or more of the methodologies discussed herein, according to an example embodiment. Specifically, FIG. 12 shows a diagrammatic representation of the machine 1200 in the example form of a computer system, within which instructions 1216 (e.g., software, a program, an application 1210, an applet, an app, or other executable code) for causing the machine 1200 to perform any one or more of the methodologies discussed herein may be executed. For example, the instructions 1216 may cause the machine 1200 to execute the method 900 of FIG. 9 or the method 10 of FIG. 10. Additionally, or alternatively, the instructions 1216 may implement FIGS. 1-8, and so forth. The instructions 1216 transform the general, non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

The machine 1200 may include processors 1210, memory 1230, and I/O components 1250, which may be configured to communicate with each other such as via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1212 and a processor 1214 that may execute the instructions 1216. The term "processor" is intended to include multi-core processors 1210 that may comprise two or more independent processors 1212 (sometimes referred to as "cores") that may execute instructions 1216 contemporaneously. Although FIG. 12 shows multiple processors 1210, the machine 1200 may include a single processor 1212 with a single core, a single processor 1212 with multiple cores (e.g., a multi-core processor), multiple processors 1210 with a single core, multiple processors 1210 with multiple cores, or any combination thereof.

The memory 1230 may include a main memory 1232, a static memory 1234, and a storage unit 1236, all accessible to the processors 1210 such as via the bus 1202. The main memory 1232, the static memory 1234, and the storage unit 1236 store the instructions 1216 embodying any one or more of the methodologies or functions described herein. The instructions 1216 may also reside, completely or partially, within the main memory 1232, within the static memory 1234, within the storage unit 1236, within at least one of the processors 1210 (e.g., within the processor's cache memory), or any suitable combination thereof, during execution thereof by the machine 1200.

The I/O components 1250 may include a wide variety of components to receive input, provide output, produce output, transmit information, exchange information, capture measurements, and so on. The specific I/O components 1250 that are included in a particular machine 1200 will depend on the type of machine 1200. For example, portable machines such as mobile phones will likely include a touch input device or other such input mechanisms, while a headless server machine will likely not include such a touch input device. It will be appreciated that the I/O components 1250 may include many other components that are not shown in FIG. 12. The I/O components 1250 are grouped according to functionality merely for simplifying the following discussion, and the grouping is in no way limiting. In various example embodiments, the I/O components 1250 may include output components 1252 and input components 1254. The output components 1252 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1250 may include biometric components 1256, motion components 1258, environmental components 1260, or position components 1262, among a wide array of other components. For example, the biometric components 1256 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 may include acceleration sensor components (e.g., accelerometer), gravitation sensor components, rotation sensor components (e.g., gyroscope), and so forth. The environmental components 1260 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1262 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 may include a network interface component or another suitable device to interface with the network 1280. In further examples, the communication components 1264 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1270 may be another machine or any of a wide variety of peripheral devices (e.g., a peripheral device coupled via a USB).

Moreover, the communication components 1264 may detect identifiers or include components operable to detect identifiers. For example, the communication components 1264 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1264, such as location via Internet Protocol (IP) geolocation, location via Wi-Fi® signal triangulation, location via detecting an NFC beacon signal that may indicate a particular location, and so forth.

The various memories (i.e., 1230, 1232, 1234, and/or memory of the processor(s) 1210) and/or the storage unit 1236 may store one or more sets of instructions 1216 and data structures (e.g., software) embodying or utilized by any one or more of the methodologies or functions described herein. These instructions (e.g., the instructions 1216), when executed by the processor(s) 1210, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 1216 and/or data. The terms shall accordingly be taken to include, but not be limited to, solid-state memories, and optical and magnetic media, including memory internal or external to the processors 1210. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1280 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 1216 may be transmitted or received over the network 1280 using a transmission medium via a network interface device (e.g., a network interface component included in the communication components 1264) and utilizing any one of a number of well-known transfer protocols (e.g., HTTP). Similarly, the instructions 1216 may be transmitted or received using a transmission medium via the coupling 1272 (e.g., a peer-to-peer coupling) to the devices 1270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1216 for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method performed by a computer system having a memory and at least one hardware processor, the computer-implemented method comprising:

obtaining training data comprising a plurality of reference skill pairs, each reference skill pair comprising a first reference skill and a second reference skill, the plurality of reference skill pairs being included in the training data based on the first and second reference skills for each reference skill pair in the plurality of reference skill pairs co-occurring for a same entity, the plurality of reference skill pairs being included in the training data is further based on an indication of a temporal order of the first and second reference skills for the same entity for each reference skill pair in the plurality of reference skill pairs;

training a dependency model with a first machine learning algorithm using the plurality of reference skill pairs of the training data, the plurality of reference skill pairs being used in the training of the dependency model based on the indication of the temporal order of the first and second reference skills for the same entity for each reference skill pair in the plurality of reference skill pairs, the dependency model comprising a logistic regression model or a data gradient boosted decision tree (GBDT) model;

training a Bidirectional Encoder Representations from Transformers (BERT) model with a second machine learning algorithm using the plurality of reference skill pairs of the training data, the plurality of reference skill pairs being used in the training of the BERT model based on the indication of the temporal order of the first and second reference skills for the same entity for each reference skill pair in the plurality of reference skill pairs;

identifying a dependency relation for each target skill pair in a plurality of target skill pairs using the dependency model, each target skill pair in the plurality of target skill pairs comprising a first target skill and a second target skill;

for each target skill pair in the plurality of target skill pairs, determining a relation direction using the BERT model; and using the identified dependency relation and determined relation direction for at least a portion of the plurality of target skill pairs in an application of an online service.

2. The computer-implemented method of claim 1, wherein the indication of the temporal order comprises an indication of a chronological sequence that includes the first and second reference skills for the same entity.

3. The computer-implemented method of claim 1, wherein the same entity comprises a sequential playlist of online courses available to users for viewing via the online service, the plurality of reference skill pairs being included in the training data is further based on the first reference skill being associated with a first online course in the sequence of online courses and the second reference skill being associated with a second online course in the sequence of online courses.

4. The computer-implemented method of claim 1, wherein the same entity comprises a history of online courses that have been watched by a user of the online service, the history of online courses being stored in association with the user, the plurality of reference skill pairs being included in the training data is further based on the first reference skill being associated with a first online course in the history of online courses and the second reference skill being associated with a second online course in the history of online courses.

5. The computer-implemented method of claim 1, wherein the same entity comprises a history of a user adding skills to a profile of the user, the profile being stored in a database of the online service.

6. The computer-implemented method of claim 1, wherein the same entity comprises an online job posting that includes the first reference skill and the second reference skill.

7. The computer-implemented method of claim 1, further comprising generating a directed graph using the identified dependency relation and determined relation direction for the plurality of target skill pairs, wherein the using the at least a portion of the plurality of target skills in the application of the online service comprises using the directed graph in the application of the online service.

8. The computer-implemented method of claim 1, wherein the using the identified dependency relation and determined relation direction for at least a portion of the plurality of target skill pairs in the application of the online service comprises:
displaying, on a computing device of a target user, a selectable user interface element for each second target skill in the at least a portion of the plurality of target skill pairs, the selectable user interface element being configured to trigger storing of the second target skill as part of the profile of the target user in response to a selection of the selectable user interface element.

9. The computer-implemented method of claim 1, wherein the using the identified dependency relation and determined relation direction for at least a portion of the plurality of target skill pairs in the application of the online service comprises:
displaying, on a computing device of a target user, a selectable user interface element for an online job posting, the selectable user interface element being configured to, in response to its selection, trigger a display of the online job posting on the computing device of the target user or initiate an online application process for the online job posting on the computing device of the target user.

10. The computer-implemented method of claim 1, wherein the using the identified dependency relation and determined relation direction for at least a portion of the plurality of target skill pairs in the application of the online service comprises:
determining that a profile of a target user of the online service includes the first target skill of each target skill pair in the at least a portion of the plurality of target skill pairs;
determining that an online course includes the second target skill of each target skill pair in the at least a portion of the plurality of target skill pairs;
selecting the online course based on the determining that the profile of the target user includes the first target skill of each target skill pair in the at least a portion of the plurality of target skill pairs, the determining that the online course includes the second target skill of each target skill pair in the at least a portion of the plurality of target skill pairs, and the identified dependency relation and determined relation direction for the at least a portion of the plurality of target skill pairs; and
displaying, on a computing device of the target user, a selectable user interface element for the online course based on the selecting the online course, the selectable user interface element being configured to, in response to its selection, trigger a playing of a multimedia file of the online course on the computing device or initiate an online process for playing the multimedia file of the online course on the computing device.

11. The computer-implemented method of claim 1, wherein the using the identified dependency relation and determined relation direction for at least a portion of the plurality of target skill pairs in the application of the online service comprises:
determining that a profile of a first target user of the online service includes the first target skill of each target skill pair in the at least a portion of the plurality of target skill pairs;
determining that a search query submitted by a second target user includes the second target skill of each target skill pair in the at least a portion of the plurality of target skill pairs;
selecting the profile of the first target user based on the determining that the profile of the first target user includes the first target skill of each target skill pair in the at least a portion of the plurality of target skill pairs, the determining that the search query includes the second target skill of each target skill pair in the at least a portion of the plurality of target skill pairs, and the identified dependency relation and determined relation direction for the at least a portion of the plurality of target skill pairs; and
displaying, on a computing device of the second target user, a user interface element that identifies the profile of the first target user based on the selecting the profile of the first target user.

12. A system comprising:
at least one hardware processor; and
a non-transitory machine-readable medium embodying a set of instructions that, when executed by the at least one hardware processor, cause the at least one hardware processor to perform operations, the operations comprising:
obtaining training data comprising a plurality of reference skill pairs, each reference skill pair comprising a first reference skill and a second reference skill, the plurality of reference skill pairs being included in the training data based on the first and second reference skills for each reference skill pair in the plurality of reference skill pairs co-occurring for a same entity, the plurality of reference skill pairs being included in the training data is further based on an indication of a temporal order of the first and second reference skills for the same entity for each reference skill pair in the plurality of reference skill pairs;
training a dependency model with a first machine learning algorithm using plurality of reference skill pairs of the training data, the plurality of reference skill pairs being used in the training of the dependency model based on the indication of the temporal order of the first and second reference skills for the same entity for each reference skill pair in the plurality of reference skill pairs, the dependency model comprising a logistic regression model or a data gradient boosted decision tree (GBDT) model;
training a Bidirectional Encoder Representations from Transformers (BERT) model with a second machine learning algorithm using the plurality of reference skill pairs of the training data, the plurality of reference skill pairs being used in the training of the BERT model based on the indication of the temporal order of the first and second reference skills for the same entity for each reference skill pair in the plurality of reference skill pairs;
identifying a dependency relation for each target skill pair in a plurality of target skill pairs using the dependency model, each target skill pair in the plurality of target skill pairs comprising a first target skill and a second target skill, the dependency relation being between the first and second target skills of the target skill pair;

for each target skill pair in the plurality of target skill pairs, determining a relation direction using the BERT model; and using the identified dependency relation and determined relation direction for at least a portion of the plurality of target skill pairs in an application of an online service.

13. The system of claim 12, wherein the indication of the temporal order comprises an indication of a chronological sequence that includes the first and second reference skills for the same entity.

14. The system of claim 12, wherein the same entity comprises a sequential playlist of online courses available to users for viewing via the online service, the plurality of reference skill pairs being included in the training data is further based on the first reference skill being associated with a first online course in the sequence of online courses and the second reference skill being associated with a second online course in the sequence of online courses.

15. The system of claim 12, wherein the same entity comprises a history of online courses that have been watched by a user of the online service, the history of online courses being stored in association with the user, the plurality of reference skill pairs being included in the training data is further based on the first reference skill being associated with a first online course in the history of online courses and the second reference skill being associated with a second online course in the history of online courses.

16. The system of claim 12, wherein the same entity comprises a history of a user adding skills to a profile of the user, the profile being stored in a database of the online service.

17. The system of claim 12, wherein the same entity comprises an online job posting that includes the first reference skill and the second reference skill.

18. The system of claim 12, wherein the operations further comprise generating a directed graph using the identified dependency relation and determined relation direction for the plurality of target skill pairs, wherein the using the at least a portion of the plurality of target skills in the application of the online service comprises using the directed graph in the application of the online service.

19. The system of claim 12, wherein the using the identified dependency relation and determined relation direction for at least a portion of the plurality of target skill pairs in the application of the online service comprises:

determining that a profile of a target user of the online service includes the first target skill of each target skill pair in the at least a portion of the plurality of target skill pairs;

selecting the second target skill of each target skill pair in the at least a portion of the plurality of target skill pairs based on the identified dependency relation and determined relation direction for the at least a portion of the plurality of target skill pairs; and displaying, on a computing device of the target user, a selectable user interface element for each selected second target skill in the at least a portion of the plurality of target skill pairs, the selectable user interface element being configured to trigger storing of the second target skill as part of the profile of the target user in response to a selection of the selectable user interface element.

20. A non-transitory machine-readable medium embodying a set of instructions that, when executed by at least one hardware processor, cause the at least one hardware processor to perform operations, the operations comprising:

obtaining training data comprising a plurality of reference skill pairs, each reference skill pair comprising a first reference skill and a second reference skill, the plurality of reference skill pairs being included in the training data based on the first and second reference skills for each reference skill pair in the plurality of reference skill pairs co-occurring for a same entity, the plurality of reference skill pairs being included in the training data is further based on an indication of a temporal order of the first and second reference skills for the same entity for each reference skill pair in the plurality of reference skill pairs;

training a dependency model with a first machine learning algorithm using the plurality of reference skill pairs of the training data, the plurality of reference skill pairs being used in the training of the dependency model based on the indication of the temporal order of the first and second reference skills for the same entity for each reference skill pair in the plurality of reference skill pairs, the dependency model comprising a logistic regression model or a data gradient boosted decision tree (GBDT) model;

training a Bidirectional Encoder Representations from Transformers (BERT) model with a second machine learning algorithm using the plurality of reference skill pairs of the training data, the plurality of reference skill pairs being used in the training of the BERT model based on the indication of the temporal order of the first and second reference skills for the same entity for each reference skill pair in the plurality of reference skill pairs;

identifying a dependency relation for each target skill pair in a plurality of target skill pairs using the dependency model, each target skill pair in the plurality of target skill pairs comprising a first target skill and a second target skill, the dependency relation being between the first and second target skills of the target skill pair;

for each target skill pair in the plurality of target skill pairs, determining a relation direction using the BERT model; and using the identified dependency relation and determined relation direction for at least a portion of the plurality of target skill pairs in an application of an online service.

* * * * *